US008916049B2

(12) United States Patent
Nishijima

(10) Patent No.: US 8,916,049 B2
(45) Date of Patent: Dec. 23, 2014

(54) METHOD AND APPARATUS FOR PROCESSING MIXTURE

(75) Inventor: Shigehiro Nishijima, Suita (JP)

(73) Assignees: Osaka University, Suita-shi (JP); Ube Industries, Ltd., Ube-shi (JP)

( * ) Notice: Subject to any disclaimer, the term of this patent is extended or adjusted under 35 U.S.C. 154(b) by 483 days.

(21) Appl. No.: 13/146,134

(22) PCT Filed: Jan. 22, 2010

(86) PCT No.: PCT/JP2010/050774

§ 371 (c)(1), (2), (4) Date: Jul. 25, 2011

(87) PCT Pub. No.: WO2010/084945

PCT Pub. Date: Jul. 29, 2010

(65) Prior Publication Data

US 2011/0278231 A1 Nov. 17, 2011

(30) Foreign Application Priority Data

Jan. 23, 2009 (JP) ................................ 2009-013358
Aug. 10, 2009 (WO) .................. PCT/JP2009/064110

(51) Int. Cl.

| | |
|---|---|
| ***B03C 1/023*** | (2006.01) |
| ***C02F 1/48*** | (2006.01) |
| ***C02F 1/52*** | (2006.01) |
| ***C02F 1/66*** | (2006.01) |
| ***B03C 1/28*** | (2006.01) |
| ***B24B 1/04*** | (2006.01) |

(52) U.S. Cl.

CPC . *B03C 1/286* (2013.01); *B24B 1/04* (2013.01); *B03C 2201/18* (2013.01)

USPC ........... 210/695; 210/665; 210/668; 210/222; 209/5; 209/8; 209/39; 209/214

(58) Field of Classification Search

USPC ......... 210/222, 223, 695, 633, 634, 639, 663, 210/665, 668, 702, 714, 723, 724, 738, 210/743; 209/5, 8, 9, 39, 214

See application file for complete search history.

(56) References Cited

U.S. PATENT DOCUMENTS 4,225,425 A * 9/1980 Price et al. ........................ 209/5
4,279,756 A * 7/1981 Weiss et al. .................. 210/667

(Continued)

FOREIGN PATENT DOCUMENTS

JP 57-53256 A 3/1982
JP 9-75630 A 3/1997

(Continued)

OTHER PUBLICATIONS

Nishijima et al., Recycling of abrasives from wasted slurry by superconducting magnetic separation, IEEE Transactions on applied superconductivity, vol. 13, No. 2, Jun. 2003, pp. 1596-1599.*

(Continued)

*Primary Examiner* — David C Mellon

(74) *Attorney, Agent, or Firm* — Westerman, Hattori, Daniels & Adrian, LLP

(57) ABSTRACT

The processing method for a mixture according to the present invention is a method for processing a mixture having first particles made of a magnetic material or a nonmagnetic material and second particles made of a magnetic material or a nonmagnetic material wherein the second particles are mixed in a fluid medium containing the first particles, and comprises a dispersion step of dispersing aggregates of the first particles and the second particles present in the mixture, and a magnetic separation step of providing the first particles and second particles with a magnetic force a of different magnitudes by applying a magnetic field to the mixture in parallel with or after the dispersion step, thereby separating the first particles and the second particles from each other.

13 Claims, 22 Drawing Sheets

(56) References Cited

U.S. PATENT DOCUMENTS

| | | | | |
|---|---|---|---|---|
| 4,643,822 | A * | 2/1987 | Parsonage | 209/8 |
| 4,834,898 | A * | 5/1989 | Hwang | 252/62.56 |
| 6,110,379 | A * | 8/2000 | Overton et al. | 210/695 |
| 8,066,885 | B2 * | 11/2011 | Ravishankar et al. | 210/695 |
| 8,318,025 | B2 * | 11/2012 | Domke et al. | 210/695 |
| 8,329,039 | B2 * | 12/2012 | Domke et al. | 210/695 |
| 8,372,290 | B2 * | 2/2013 | Domke et al. | 210/695 |
| 8,377,312 | B2 * | 2/2013 | Domke et al. | 210/695 |
| 8,377,313 | B2 * | 2/2013 | Domke et al. | 210/695 |

FOREIGN PATENT DOCUMENTS

| | | | |
|---|---|---|---|
| JP | 2002-136895 | A | 5/2002 |
| JP | 2002-224586 | A | 8/2002 |
| JP | 2003-147455 | A | 5/2003 |
| JP | 2005-169275 | A | 6/2005 |
| JP | 2005-334865 | A | 12/2005 |
| JP | 2006-247488 | A | 9/2006 |
| JP | 2009-6273 | A | 1/2009 |

OTHER PUBLICATIONS

F. Mishima et al.; “A superconducting magnetic separation system of ferromagnetic fine particles from a viscous fluid”; Physica C 463-465 (2007), pp. 1302-1305.

F. Mishima et al., “Research and Development of Superconducting Magnetic Separation System for Powdered Products”; IEEE Transactions on Applied Superconductivity, vol. 18, No. 2, Jun. 2008, pp. 824-827.

International Search Report of PCT/JP2010/050774, mailing date of Feb. 23, 2010.

Notification of Transmittal of Translation of the International Preliminary Report on Patentability (Form PCT/IB/338) of International Application No. PCT/JP2010/050774 mailed Sep. 22, 2011 with Form PCT/IPEA/409.

* cited by examiner

METHOD AND APPARATUS FOR PROCESSING MIXTURE

TECHNICAL FIELD

The present invention relates to a processing method and a processing apparatus for a mixture in which particles made of a magnetic material or a nonmagnetic material are mixed, and for example, for processing a mixture such as a slurry used for machining such as polishing or cutting.

BACKGROUND ART

Conventionally, for conducting machining such as polishing or cutting on semiconductors, metals and so on, a slurry in which abrasive grains or polishing grains are suspended is used. However, as the machining progresses, not only removed powder generated from the processing object, but also abrasion powder of an apparatus used in machining, for example, magnetic material particles generated by abrasion of a surface plate or a wire saw are mixed in the slurry, leading to a problem of a significant deterioration in machining accuracy. Therefore, conventionally, the slurry needs to be replaced regularly, and the used slurry is treated as industrial waste.

Diamond and the like that are precious resources are used as abrasive grains or polishing grains, and silicon and the like that are precious resources are also used as processing objects. These resources will run short in the future. Hence, for solving the shortage of resources, recycle of slurry and further recycle of abrasive or polishing grains or removed powder generated from processing objects is suggested.

For the realizing recycle of a slurry or the like, it is necessary to remove magnetic material particles from the slurry (slurry-like mixture) used in machining, and it is conceived to remove magnetic material particles from a slurry-like mixture using, for example, the magnetic separator disclosed in Patent document 1.

PRIOR ART DOCUMENT

Patent document 1: Japanese Patent Application Publication HEI. 9-75630

SUMMARY OF INVENTION

Problem to be Solved by the Invention

However, since magnetic material particles bind with abrasive or polishing grains to form aggregates in the slurry like mixture, when a conventional magnetic separator is directly applied to such a slurry-like mixture, the abrasive or polishing grains are removed from the slurry-like mixture together with the magnetic material particles, and thus a recyclable slurry cannot be obtained.

In light of this, it is the object of the present invention to provide a processing method and a processing apparatus capable of removing particles made of a magnetic material or a nonmagnetic material from a mixture in which such particles are mixed.

Means for Solving the Problem

A first method for processing a mixture according to the present invention is a method for processing a mixture having first particles made of a magnetic material or a nonmagnetic material and second particles made of a magnetic material or a nonmagnetic material wherein the second particles are mixed in a fluid medium containing the first particles, and includes a dispersion step of dispersing aggregates of the first particles and the second particles present in the mixture, and a magnetic separation step of applying a magnetic field to the mixture in parallel with or after the dispersion step to give the first particles and the second particles a magnetic force whose magnitude is different between the first particles and the second particles, thereby separating the first particles and second particles from each other.

Here, the magnetic material includes a ferromagnetic material, and the nonmagnetic material includes a paramagnetic material and a diamagnetic material.

While the first particles and the second particles in the mixture bind each other to form aggregates before the execution of the dispersion step, the aggregates are dispersed in the dispersion step. During or directly after the execution of the dispersion step, the dispersed state of the first particles and the second particles is maintained. Further, in the magnetic separation step, since the first particles and the second particles are subjected to a magnetic force having a magnitude different between each other, the first particles and the second particles are separated in different sites in the mixture. Therefore, it is possible to remove either one of the first particles or the second particles in the mixture while the other particles remain in the mixture.

By repeating the aforementioned process once or several times, most of the other particles present in the mixture can be separated and removed, and as a result, recycle of the first particles or the second particles is enabled.

A second method for processing a mixture related to the present invention is according to the first processing method, wherein vibration is given to the mixture in the dispersion step.

Due to the second processing method, the binding between the first particles and the second particles is weakened or cancelled, and as a result, the aggregates are broken down, and the first particles and the second particles are dispersed in the fluid medium.

A third method for processing a mixture related to the present invention is according to the second processing method, wherein the vibration is ultrasonic wave vibration.

Due to the third processing method, the aggregates of the first particles and the second particles are more easily broken down.

A fourth method for processing a mixture related to the present invention is according to the first processing method, wherein in the dispersion step, the mixture is stirred or an air bubble is generated in the mixture.

According to the fourth processing method, the binding between the first particles and the second particles is weakened or cancelled, and as a result, the aggregates are broken down, and the first particles and the second particles are dispersed in the fluid medium.

A fifth method for processing a mixture related to the present invention is according to the first processing method, wherein in the dispersion step, a repulsive force is generated between the first particles and the second particles by adjusting the zeta potential on the surfaces of the first particles and/or adjusting the zeta potential on the surfaces of the second particles.

Due to the fifth processing method, since a repulsive force is generated between the first particles and the second particles, the binding between the first particles and the second particles is weakened or cancelled, and as a result, the aggregates are broken down and the first particles and the second particles are dispersed in the fluid medium.

A sixth method for processing a mixture related to the present invention is according to the fifth processing method, wherein the fluid medium is made of a water-based medium, and in the dispersion step, the zeta potential on the surfaces of the first particles and/or that of the second particles are adjusted by adjusting the hydrogen ion exponent (pH) in the mixture.

A seventh method for processing a mixture related to the present invention is according to the first processing method, wherein the fluid medium is made of a gas, and in the dispersion step, the mixture flows in a flow channel where a magnetic filter is located, and the aggregates in the mixture are captured by the magnetic filter, and the gas continuously flows through the magnetic filter.

Here, the magnetic filter includes one where a magnetic field is generated in a partial area of the flow channel and one where a magnetic mesh or a magnetic filament is located in the partial area of the flow channel where the magnetic field is generated, and so on.

The first particles and the second particles in the gas bind each other by interaction between these particles or moisture in the gas and form aggregates. In the seventh processing method, the first particles and the second particles that form the aggregates are subjected to a magnetic force from the magnetic filter and the aggregates are then captured by the magnetic filter. At this time, since the gas flows continuously to the magnetic filter, the aggregates are broken down by the wind pressure of the gas or by the vaporization of the moisture in the aggregates, and one of the first particles and the second particles that are subjected to a larger magnetic force from the magnetic filter are likely to remain on the surface of the magnetic filter, and the other particles are likely to leave the magnetic filter by the wind pressure of the gas. Therefore, the first particles and the second particles are dispersed in the fluid medium.

An eighth method for processing a mixture related to the present invention is according to any one of the first to seventh processing methods, wherein in the magnetic separation step, the magnetic forces applied to the first particles and the second particles have respective predetermined magnitude relations with drag forces that the first particles and the second particles receive from the fluid medium, respectively.

Due to the eighth processing method, the particles subjected to the magnetic force which is larger than the drag force remain at a predetermined site in the fluid medium by the magnetic force against the drag force. On the other hand, the particles subjected to the magnetic force which is smaller than the drag force are flown from the predetermined site by the drag force. Therefore, by adjusting the magnitude relation between the magnetic force and the drag force for each of the first particles and the second particles, it is possible to separate the first particles and the second particles.

Therefore, a ninth method for processing a mixture related to the present invention is according to the eighth processing method, wherein in the magnetic separation step, the magnetic force applied to the first particles is larger than the drag force that the first particles receive from the fluid medium, and in the magnetic separation step, the magnetic force applied to the second particles is smaller than the drag force that the second particles receive from the fluid medium.

Due to the ninth processing method, the first particles remain at a predetermined location in the fluid medium by the magnetic force against the drag force. On the other hand, the second particles flow from the predetermined location by the drag force. Therefore, the first particles and the second particles are separated from each other.

A tenth method for processing a mixture related to the present invention is according to any one of the first to ninth processing methods, wherein in the magnetic separation step, a magnetic field is applied to the mixture using a superconducting magnet.

Due to the tenth processing method, since an external magnetic field is exerted over a wide range in the mixture by using a superconducting magnet, a larger magnetic force can be applied to more first particles and second particles, compared to a permanent magnet.

An eleventh method for processing a mixture related to the present invention is according to any one of the first to tenth processing methods, wherein in the magnetic separation step, a magnetic gradient is generated for the magnetic field in the mixture.

Due to the eleventh processing method, by generating the magnetic gradient for the magnetic field in the mixture, the magnetic force applied to the first particles or the second particles becomes large. Therefore, a large magnetic force can be exerted on the first particles or the second particles having a small particle diameter.

A twelfth method for processing a mixture related to the present invention is according to the eleventh processing method, wherein in the magnetic separation step, the magnetic gradient is generated in the magnetic field by providing magnetic gradient generating means in the mixture.

A thirteenth method for processing a mixture related to the present invention is a method for processing a mixture composed of first particles made of a magnetic material or a nonmagnetic material and second particles made of a magnetic material or a nonmagnetic material, and includes a driving force applying step of applying a driving force to the mixture so as to make the mixture flow along a flow channel, and a magnetic field applying step of applying a magnetic field to the mixture in parallel with the driving force applying step so as to make either one of the first particles or the second particles remain at a predetermined location against the driving force.

Here, the magnetic material includes a ferromagnetic material, and the nonmagnetic material includes a paramagnetic material and a diamagnetic material.

In the mixture, the first particles and the second particles bind each other to form aggregates. The driving force is applied to the aggregates in the driving force applying step. In parallel with this, the magnetic field is applied to the mixture, and as a result, either one of the first particles or the second particles tend to remain at the predetermined location against the driving force. On the other hand, the other particles tend to further move from the predetermined location by the driving force. As a result, the binding between the first particles and the second particles is weakened or cancelled, and as a result, the aggregates are broken down, and one of the first and second particles remain at the predetermined location by the magnetic force, while the other particles further move from the predetermined location by the driving force. Therefore, in the mixture, the first particles and the second particles are dispersed, and some of the first or second particles in the mixture are separated from the mixture.

A fourteenth method for processing a mixture related to the present invention is according to the thirteenth processing method, wherein in the driving force applying step, the driving force is applied to the mixture using a gas or a liquid flowing in the flow channel.

A fifteenth method for processing a mixture related to the present invention is according to the fourteenth processing method, wherein in the magnetic field applying step, a magnetic field is applied to the mixture by a magnetic filter located of the flow channel.

Here, the magnetic filter includes one where the magnetic field is generated in a partial area of the flow channel and one where a magnetic mesh or a magnetic filament is located in a partial area in the flow channel where the magnetic field is generated, and so on.

A sixteenth method for processing a mixture related to the present invention is according to the thirteenth processing method, wherein in the driving force applying step, the driving force is applied to the mixture by forming a fluid layer of the mixture in the flow channel.

A seventeenth method for processing a mixture related to the present invention is according to the sixteenth processing method, wherein in the magnetic field applying step, the magnetic field is applied to the mixture by one or more magnets located in the flow channel.

An eighteenth method for processing a mixture related to the present invention is according to any one of the first to the seventeenth processing methods, wherein the first particles or the second particles are abrasive grains or polishing grains.

A first processing apparatus for a mixture related to the present invention is an apparatus for processing a mixture of first particles made of a magnetic material or a nonmagnetic material and second particles made of a magnetic material, and includes a driving force applying part that applies a driving force to the mixture so as to make the mixture flow along the flow channel, and a magnetic field applying part for applying a magnetic field to the mixture so as to make either one of the first particles or the second particles remain at a predetermined location against the driving force.

Here, the magnetic material includes a ferromagnetic material, and the nonmagnetic material includes a paramagnet material and a diamagnetic material.

In the mixture, the first particles and the second particles bind each other to form aggregates. The driving force is applied to the aggregates in the driving force applying step. In parallel with this, the magnetic field is applied to the mixture, and as a result, either one of the first particles or the second particles tend to remain at the predetermined location against the driving force. On the other hand, the other particles tend to further move from the predetermined location by the driving force. As a result, the binding between the first particles and the second particles is weakened or cancelled, and as a result, the aggregates are broken down, and one of the first particles and second particles remain at the predetermined location by the magnetic force, while the other particles further move from the predetermined location by the driving force. Therefore, the first particles and the second particles are dispersed in the mixture, and some of the first or second particles in the mixture are separated from the mixture.

A second processing apparatus for a mixture related to the present invention is according to the first processing apparatus, wherein the driving force applying part applies the driving force to the mixture by flowing a gas or liquid in the flow channel and utilizing the gas or liquid flow.

A third processing apparatus for a mixture related to the present invention is according to the second processing apparatus, wherein the magnetic field applying part is formed of a magnetic filter located in the flow channel.

Here, the magnetic filter includes one where the magnetic field is generated in a partial area in the flow channel and one where a magnetic mesh or a magnetic filament is located in the partial area in the flow channel where the magnetic field is generated, and so on.

A fourth processing apparatus for a mixture related to the present invention is according to the first processing apparatus, wherein the driving force applying part applies the driving force to the mixture by forming a fluid layer of the mixture in the flow channel.

A fifth processing apparatus for a mixture related to the present invention is according to the fourth processing apparatus, wherein the magnetic field applying part is formed of one or more magnets located in the flow channel.

Effect of the invention

Due to the processing method and the processing apparatus for a mixture according to the present invention, it is possible to separate particles made of a magnetic material or a nonmagnetic material from a mixture in which such particles are mixed.

BEST MODES FOR CARRYING OUT THE INVENTION

Figure 1:
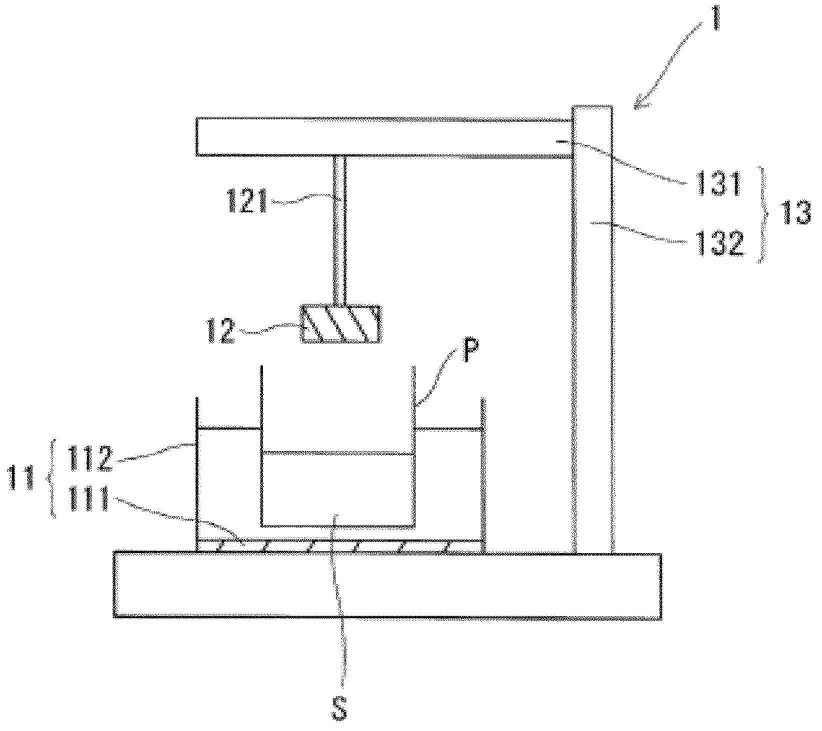
FIG. 1 is a vertical section view showing a processing apparatus used in a method for processing a mixture according to a first embodiment of the present invention.

In the following description, embodiments of the present invention will be concretely described referring to the drawings.

1. First Embodiment

A processing method according to the present embodiment is a method for processing a mixture having first particles made of a magnetic material or a nonmagnetic material and second particles made of a magnetic material or a nonmagnetic material wherein the second particles are mixed in a fluid medium containing the first particles, and it is also applicable, for example, to a slurry-like mixture S including magnetic material particles that are mixed in a slurry containing nonmagnetic material particles suspended in a liquid (fluid medium). Here, the magnetic material includes a ferromagnetic material, and the nonmagnetic material includes a paramagnet material and a diamagnetic material.

In the following, an embodiment of processing the slurry-like mixture S will be described.

The nonmagnetic material particles suspended in the slurry are, for example, grains or particles of diamond, silicon carbide or the like, or removed powder generated by processing a nonmagnetic material such as semiconductor, and the slurry-like mixture S is formed in the following manner.

When the surface of a semiconductor such as gallium nitride is subjected to a polishing process with a surface plate made of iron or stainless steel, a slurry including diamond particles which are suspended as polishing grains in a viscous liquid such as viscous alcohol or oil is used. In this case, as the polishing progresses, not only the removed powder generated from the semiconductor, but also iron powder or stainless steel powder (magnetic material particles) generated by abrasion of the surface plate are mixed into the slurry, and in this manner, the slurry-like mixture S is formed. When the surface plate is made of stainless steel, the stainless steel powder generated by abrasion or severe deformation process turns into magnetic material particles by martensitic transformation. When the diameter of the diamond particles which are polishing grains is about 1 μm, the removed powder and the iron powder or stainless steel powder have a size in the order of sub micrometer.

When a cutting process with an iron wire saw is conducted on semiconductor such as silicon, a slurry including abrasive grains of silicon carbide which are suspended in a viscous liquid such as viscous alcohol or oil is used. In this case, as the cutting progresses, not only the removed powder generated from the semiconductor but also iron powder (magnetic material particles) generated by abrasion of the wire saw are mixed in the slurry, and in this manner, the slurry-like mixture S is generated.

1-1. Processing Apparatus for Mixture

The processing method according to the present embodiment is performed using a processing apparatus 1 shown in FIG. 1. The processing apparatus 1 comprises an ultrasonic generator 11, a permanent magnet 12 and an elevator 13. The ultrasonic generator 11 comprises a vibrating part 111 for generating an ultrasonic wave, and a water tank 112 wherein the vibrating part 111 is located in the bottom face of water tank 112. The water tank 112 is filled with water up to a predetermined level, and a container P containing a slurry-like mixture S is immersed into the water inside the water tank 112. Thus, ultrasonic wave vibration generated in the vibrating part 111 is transmitted to the slurry-like mixture S in the container P via the water.

The elevator 13 includes a moving part 131 capable of reciprocally moving in a vertical direction and a support base 132 for supporting the moving part 131, and the permanent magnet 12 is located in the distal end of a bar-shaped member 121 extending downward from the moving part 131. Here, a permanent magnet having a magnetic flux density of various magnitudes may be used as the permanent magnet 12.

Figure 2:
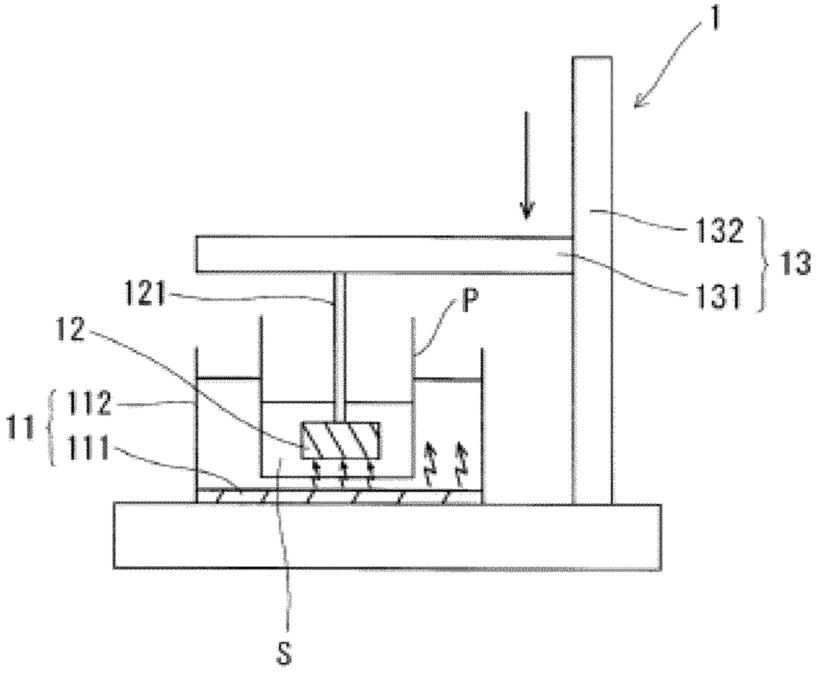
FIG. 2 is a vertical section view for illustrating a method for processing a mixture by the processing apparatus.

In the processing apparatus 1, after placing the container P containing the slurry-like mixture S below the permanent magnet 12, the permanent magnet 12 can be immersed into the slurry-like mixture S in the container P by lowering the moving part 131 of the elevator 13 as shown in FIG. 2.

On the other hand, as shown in FIG. 1, the permanent magnet 12 can be taken out of the slurry-like mixture S in the container P by elevating the moving part 131 of the elevator 13.

1-2. Processing Method of Mixture

A method for processing the slurry-like mixture S with the processing apparatus 1 will be described. First, as shown in FIG. 1, the container P containing the slurry-like mixture S is immersed into the water stored in the water tank 112 of the ultrasonic generator 11. At this time, the container P is immersed into the water in the water tank 112 so as to place the slurry-like mixture S in the container P below the water level.

In this phase, the nonmagnetic material particles and magnetic material particles in the slurry-like mixture S mutually bind to form aggregates.

Next, an ultrasonic wave is generated by the ultrasonic generator 11, and ultrasonic wave vibration is applied to the slurry-like mixture S. Since the aggregates of nonmagnetic material particles and magnetic material particles present in the slurry-like mixture S strongly vibrate because of this ultrasonic wave vibration, the binding between the nonmagnetic material particles and the magnetic material particles is weakened or cancelled, so that the aggregates are broken down and the nonmagnetic material particles and the magnetic material particles are dispersed in the slurry-like mixture S.

During the time when an ultrasonic wave is generated by the ultrasonic generator 11, the dispersed state of the nonmagnetic material particles and the magnetic material particles is maintained.

After using the ultrasonic generator 11 to make the nonmagnetic material particles and the magnetic material particles dispersed in the slurry-like mixture S, the moving part 131 of the elevator 13 is lowered as shown in FIG. 2 to immerse the permanent magnet 12 in the slurry-like mixture S in the container P. At this time, the ultrasonic wave vibration is continuously applied to the slurry-like mixture S with the ultrasonic generator 11.

Thus, a magnetic field is applied to the slurry-like mixture S by the permanent magnet 12 while the ultrasonic wave vibration is applied to the slurry-like mixture S by the ultrasonic generator 11.

By immersing the permanent magnet 12 in the slurry-like mixture S, each of the magnetic material particles and the nonmagnetic material particles in the slurry-like mixture S will be subjected to a magnetic force Fm of different magnitudes from the permanent magnet 12. The magnetic force Fm is generally represented by a three-dimensional vector. When the magnetic material particles are spherical (radius b), the magnetic force Fm is represented by the following formula 1. Here, a symbol with a right-pointing arrow on its head represents a vector. The symbol M represents magnetization of the magnetic material particles and the symbol H represents an external magnetic field generated by the permanent magnet 12. The symbol "∇" in the formula 1 is a vector operator.

$$\vec{Fm}=4/3\pi b^3(\vec{M}\cdot\nabla)\vec{H} \qquad (1)$$

Given the state where the external magnetic field H is applied in only one direction, the above formula 1 can be transformed into a one-dimensional representation and the magnetic force Fm can be represented by the following formula 2.

Since the magnetic material particles generate larger magnetization with respect to the external magnetic field H than the nonmagnetic material particles, the magnetic material particles receive a larger magnetic force Fm than the nonmagnetic material particles. Therefore, the magnetic material particles are more likely to be absorbed by to the permanent magnet 12 than the nonmagnetic material particles.

$$Fm=\frac{4}{3}\pi b^3 M\cdot\frac{dH}{dx} \qquad (2)$$

On the other hand, when the magnetic material particles and the nonmagnetic material particles move in the slurry-like mixture S, each of the magnetic material particles and the nonmagnetic material particles respectively receive a drag force Fd from the liquid, which is a fluid medium. The drag force Fd is generally represented by the following formula 3. Here, the symbol $C_D$ represents a drag coefficient, the symbol ρ represents the density of the liquid, the symbol Vf represents the velocity of the liquid, and the symbol S represents a standard area of a particle. The drag coefficient $C_D$ is an amount that varies depending on the Reynolds number. As the standard area S, the projected area of a particle onto the plane that is perpendicular to the flow direction of the liquid is used.

$$Fd=C_D\tfrac{1}{2}\rho(Vf)^2S \qquad (3)$$

Here, when the particles are spherical (radius b) and the value of the Reynolds number $C_D$ is smaller than 10, the drag force Fd can be represented by the following formula 4. Here, the symbol η represents the viscosity coefficient of the liquid, and the symbol Vp represents the velocity of the magnetic material particle.

$$Fd=6\pi\eta b(Vf-Vp) \qquad (4)$$

The particles in the liquid are further subjected to a gravitational force and a diffusing force, however, the gravitational force and the diffusing force can be usually neglected. Concretely, when the diameter of the particles is small and the gravity applied to the particles is sufficiently smaller than the drag force Fd which the particles receive in the liquid, the gravitational force applied to the particles can be neglected. When the diameter of the particles is appropriately small, the gravitational force as well as the diffusing force applied to the particles can be neglected. However, when the diameter of the particles is too small, the diffusing force of the particles can no longer be neglected.

In case that the gravitational force and the diffusing force applied to the particles can be neglected, the magnetic material particles subjected to the magnetic force Fm which is larger than the received drag force Fd are attracted toward the permanent magnet 12 and adsorbed to the surface of the permanent magnet 12. As a result of this, the magnetic material particles in the slurry-like mixture S are placed on one site in the slurry-like mixture S.

Thereafter, the moving part 131 of the elevator 13 is elevated and the permanent magnet 12 is taken out of the slurry-like mixture S in the container P. As a result, the magnetic material particles are removed from the slurry-like mixture S. At this time, most of the nonmagnetic material particles remain in the slurry-like mixture S.

Therefore, according to the processing method described above, the magnetic material particles can be separated and removed from the slurry-like mixture S while leaving most of the nonmagnetic material particles in the slurry-like mixture S.

By conducting the processing method described above once or several times for the slurry-like mixture S, most of the magnetic material particles present in the slurry-like mixture S are separated and removed, with the result that a recyclable slurry is obtained.

Further, it is possible to separately take out particles of diamond, silicon carbide or the like and removed powder made of semiconductor or the like by conducting centrifugation on the processed slurry, so that the recycling of these nonmagnetic material particles is enabled.

1-3. Processing Experiments of Mixture

The inventor of the present application carried out experiments of separating and removing magnetic material particles using the processing method according to the first embodiment, and confirmed that for two kinds of slurry-like mixture S, magnetic material particles can be removed from the slurry-like mixture S while leaving nonmagnetic material particles in the slurry-like mixture S.

Experiment 1

Experimental Method

A Slurry-like mixture S including diamond particles, removed powder of semiconductor and iron powder (magnetic material particles) which are suspended in viscous alcohol was used as an experimental object. This slurry-like mixture S is formed when a surface of semiconductor such as gallium nitride is subjected to a polishing process using an iron surface plate with a slurry having diamond particles suspended in viscous alcohol.

In this experiment, 60 mL of the slurry-like mixture S was poured into the container P. The output of the ultrasonic generator 11 was set to 55 W and the frequency of the generated ultrasonic wave was set to 40 kHz. A neodymium magnet was used as the permanent magnet 12 and the maximum value of magnetic flux density was about 0.3 T on its surface.

Ultrasonic wave vibration was given to the slurry-like mixture S in the container P with the ultrasonic generator 11 to make the nonmagnetic material particles and the magnetic material particles disperse in the slurry-like mixture S. Thereafter, the permanent magnet 12 was immersed into the slurry-like mixture S in the container P for 30 seconds while the ultrasonic wave vibration was applied to the slurry-like mixture S. Then the permanent magnet 12 was taken out of the slurry-like mixture S.

3 mL of the processed slurry-like mixture S was collected and an amount of the iron powder contained therein was measured by means of a magnetic balance.

Figure 3:
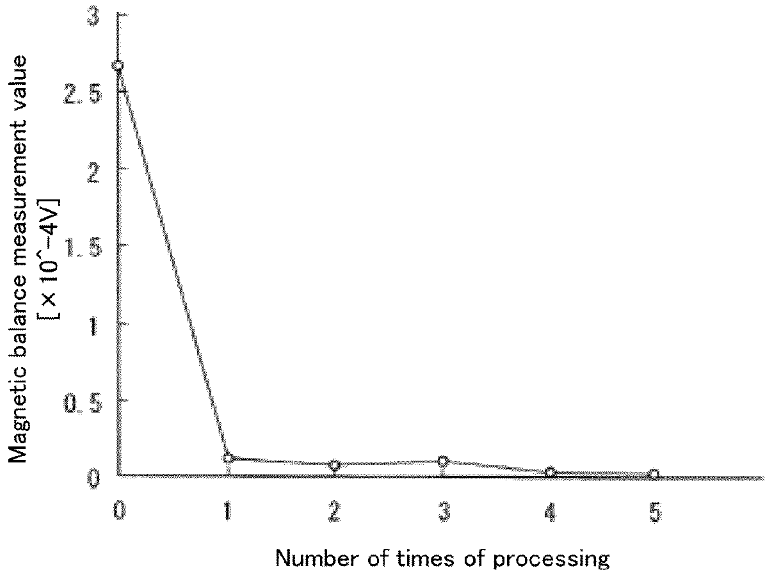
FIG. 3 is a graphic representation of the relation between the number of times of processing and a value measured by the magnetic balance in case that the processing method is applied to one example of a slurry-like mixture.

In this experiment, a step of the separation and removal of the iron powder was repeated five times for the same slurry-like mixture S and an amount of the iron powder was measured with the magnetic balance every time. FIG. 3 is a graphic representation of the result. In FIG. 3, values measured by the magnetic balance (magnetic balance value) are shown as output voltage of the magnetic balance. The amount of the iron powder is proportional to the output voltage, and the smaller the output voltage, the smaller the amount of the iron powder. This relation between the output voltage and the amount of the iron powder is also applied below.

Figure 4:
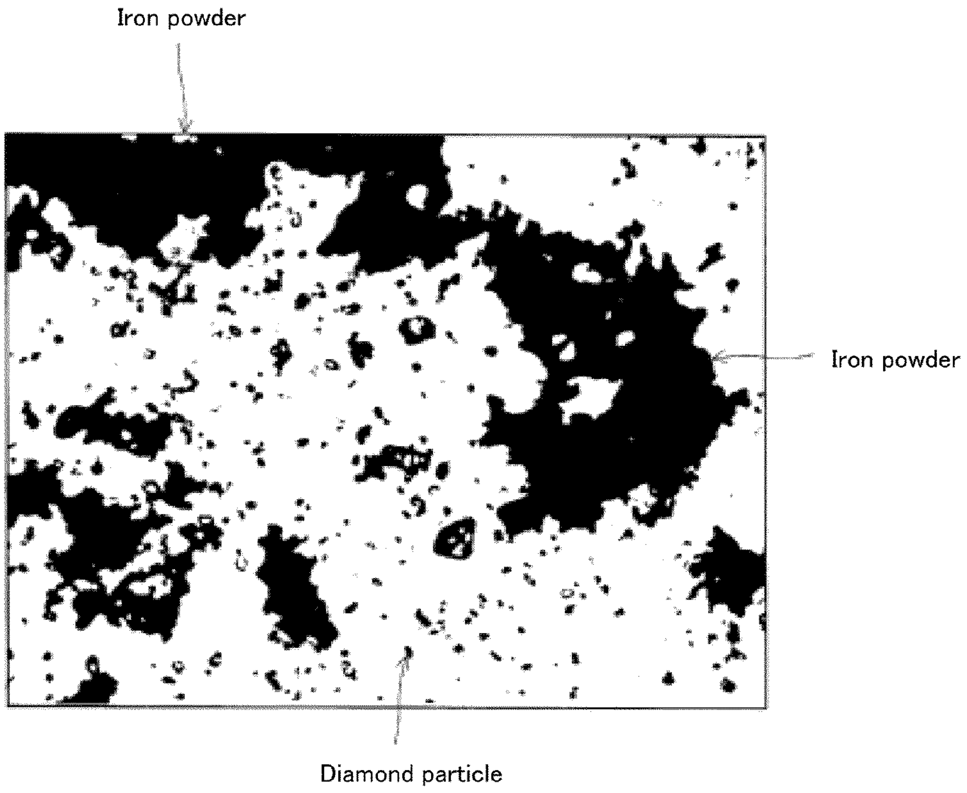
FIG. 4 is a view showing a microscopic observation image of a slurry-like mixture before processing it.
Figure 5:
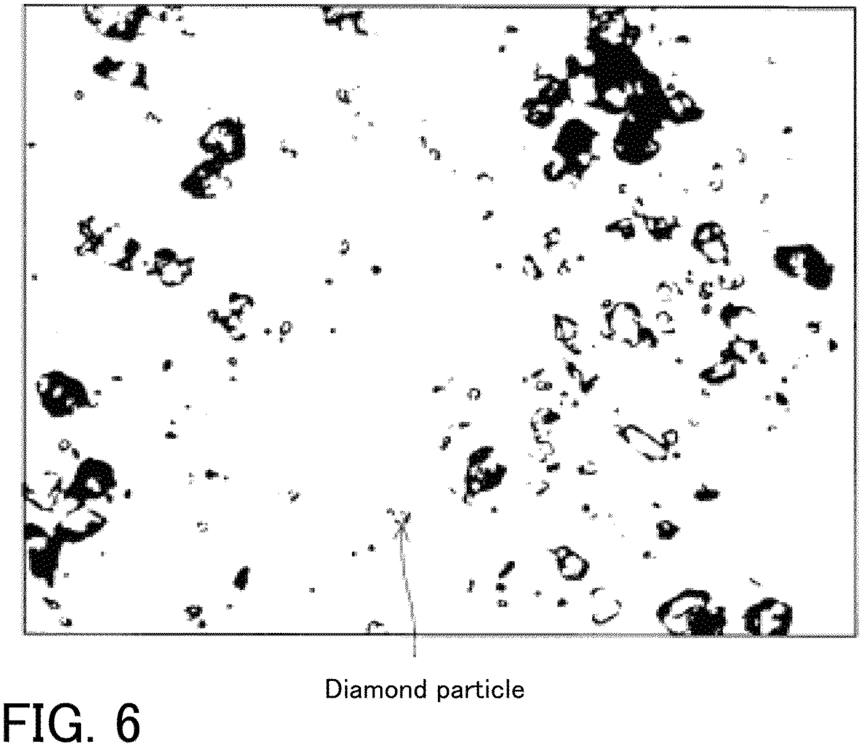
FIG. 5 is a view showing a microscopic observation image of a slurry-like mixture after processing it.

For the slurry-like mixture S before processing and the slurry-like mixture S after processing (the step of separation and removal of the iron powder was repeated five times), centrifugation was conducted at a rotation number of 1500 rpm for 15 minutes to separate and remove the removed powder of the semiconductor from the slurry-like mixture S. Then, microscopic observation was conducted for the slurry-like mixture S from which the removed powder of semiconductor was removed. FIG. 4 shows an observation image of the slurry-like mixture S subjected to the centrifugation before separating and removing the magnetic material particles. FIG. 5 shows an observation image of the slurry-like mixture S subjected to the centrifugation after separating and removing the magnetic material particles.

Experimental Result

From the graph shown in FIG. 3, it can be seen that the iron powder decreases from an amount corresponding to about $2.7\times10^{-4}$ V before processing to an amount corresponding to about $0.1\times10^{-4}$ V by conducting the aforementioned process just once. Therefore, it is revealed that as for the slurry-like mixture S used in this experiment, most of the iron powder is removed from the slurry-like mixture S by conducting the aforementioned process just once.

Comparison between the observation images shown in FIG. 4 and FIG. 5 reveals that although there is plenty of iron powder (aggregates of iron powder and other inclusions) in the slurry-like mixture S before processing, there is little iron powder remaining in the slurry-like mixture S after processing. It is also revealed that many diamond particles remain in the slurry-like mixture S after processing.

Therefore, it was confirmed that by using the processing method according to this embodiment, the iron powder can be removed from the slurry-like mixture S while leaving the diamond particles in the slurry-like mixture S.

Experiment 2

Experimental Method

A slurry-like mixture S including particles of silicon carbide, removed powder of semiconductor and iron powder (magnetic material particles) which are suspended in viscous alcohol was used as an experimental object. This slurry-like mixture S is formed when a semiconductor such as silicon is subjected to a cutting process using by an iron wire saw with a slurry that contains particles of silicon carbide suspended in viscous alcohol.

Figure 6:
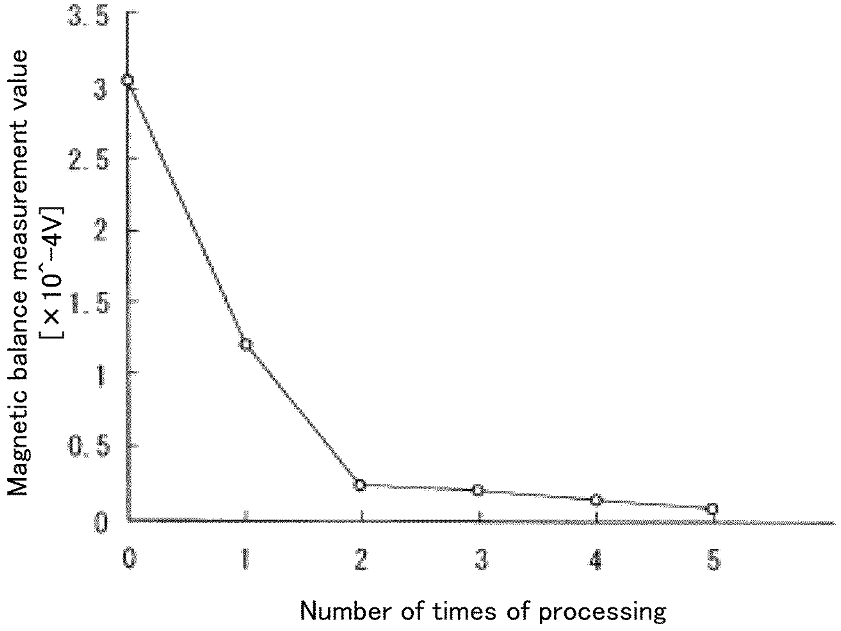
FIG. 6 is a graphic representation of the relation between a number of times of processing and a value measured by a magnetic balance in case that the processing method is applied to another example of a slurry-like mixture.

Then, for the above slurry-like mixture S, the same process as Experiment 1 was repeated five times in the same conditions, and an amount of the iron powder (magnetic material particles) contained in the slurry-like mixture S was measured by a magnetic balance every time the process was conducted. FIG. 6 is a graphic representation of the results.

Experimental Result

From the graph shown in FIG. 6, it is revealed that the iron powder contained in an amount corresponding to about $3.0\times10^{-4}$ V before processing decreases to an amount corresponding to about $0.2\times10^{-4}$ V by conducting the aforementioned process twice. Therefore, it is revealed that the processing method according to the present embodiment is applicable also to the slurry-like mixture S including particles of silicon carbide, removed powder of semiconductor and iron powder (magnetic material particles) which are suspended in viscous alcohol.

Comparison between the graphs of FIG. 3 and FIG. 6 reveals that the slurry-like mixture S used in this experiment requires a larger number of processes than the slurry-like mixture S used in Experiment 1 for reducing the amount of the magnetic material particles in the slurry-like mixture S to an amount corresponding to about $0.1\times10^{-4}$ V.

This is thought to be due to the fact that the silicon carbide, the removed powder (silicon) and the iron powder in the slurry-like mixture S used in this experiment are more likely to aggregate than the diamond particles, the removed powder and the iron powder in the slurry-like mixture S used in Experiment 1.

1-4. Modified Example 1

In the processing method, when the dispersed state of the nonmagnetic material particles and the magnetic material particles is maintained after stopping the application of the ultrasonic wave vibration to the slurry-like mixture S, the magnetic field may be applied after stopping the application of the ultrasonic wave.

Also in the processing method according to the present modified example, likewise the processing method as described above, the magnetic material particles can be separated and removed from the slurry-like mixture S while leaving the nonmagnetic material particles in the slurry-like mixture S.

1-5. Modified Example 2

Figure 7:
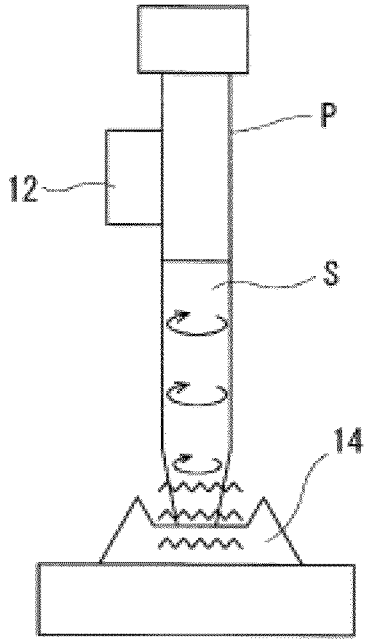
FIG. 7 is a vertical section view showing a processing apparatus used in a method for processing a mixture according to the modified example 2 of the first embodiment.

In the processing method, ultrasonic wave vibration is applied to the slurry-like mixture S using the ultrasonic generator 11. In place of this, rotational vibration may be applied to the slurry-like mixture S using a rotational vibration generator 14 as shown in FIG. 7. In the example shown in FIG. 7, the permanent magnet 12 is attached to the outer circumferential face of the container P.

Since the aggregates of the nonmagnetic material particles and the magnetic material particles present in the slurry-like mixture S vibrate by the rotational vibration given to the slurry-like mixture S, the binding between the nonmagnetic material particles and the magnetic material particles is weakened or cancelled, and thus the aggregates are broken down and the nonmagnetic material particles and the magnetic material particles are dispersed in the slurry-like mixture S. Receiving the magnetic force Fm from the permanent magnet 12, the dispersed magnetic material particles are placed on one site in the slurry-like mixture S.

The inventor of the present application made an experiment of separating and removing magnetic material particles using the processing method, and confirmed that the magnetic material particles can be removed from the slurry-like mixture S while leaving the nonmagnetic material particles in the slurry-like mixture S. Here, a slurry-like mixture S including diamond particles, semiconductor removed powder and iron powder (magnetic material particles) which are suspended in viscous alcohol was used as an experimental object.

In the present experiment, 25 mL of the slurry-like mixture S was poured into the container P and a rotational vibration was applied to for the container P for one minute by the rotational vibration generator 14. Here, a neodymium magnet was used as the permanent magnet 12 and the maximum value of magnetic flux density was about 0.2 T on its surface.

Figure 8:
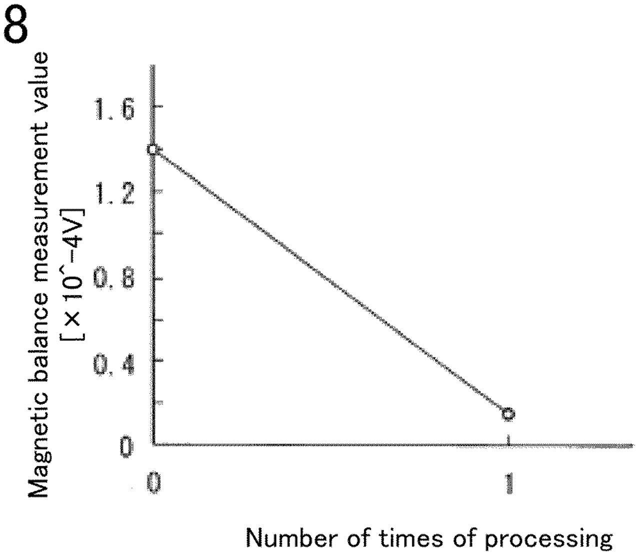
FIG. 8 is a graphic representation of the relation between the number of times of processing and a value measured by the magnetic balance in case that the processing method is applied to a slurry-like mixture.

Then the slurry-like mixture S was collected after processing, and the amount of iron powder contained therein was measured by a magnetic balance. FIG. 8 shows the results.

Figure 9:
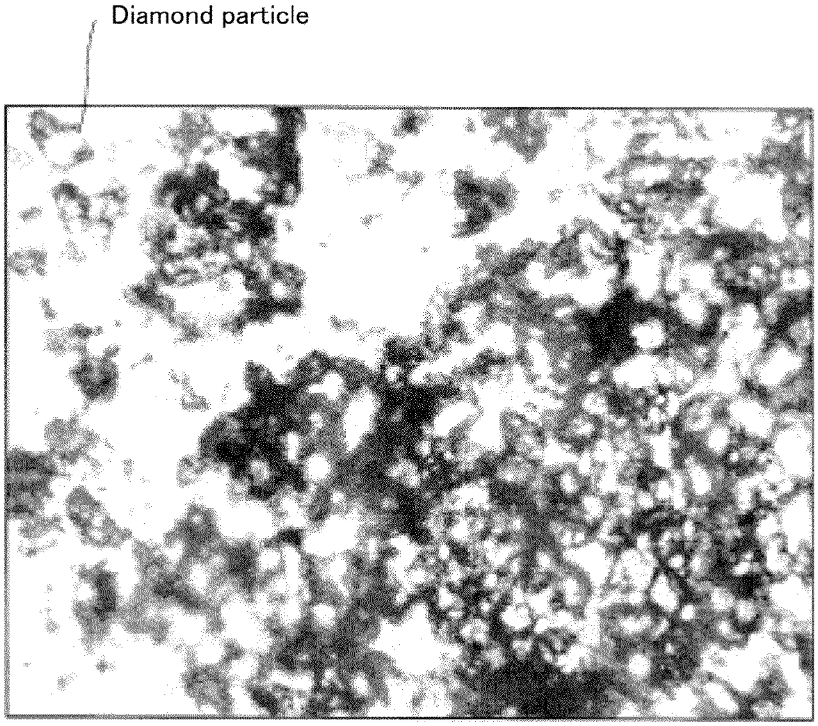
FIG. 9 is a view showing a microscopic observation image of a slurry-like mixture after processing it.

The processed slurry-like mixture S was centrifuged at a rotation speed of 1500 rpm for 15 minutes to separate and remove the semiconductor removed powder from the slurry-like mixture S. The slurry-Like mixture S from which the semiconductor removed powder was removed was microscopically observed. FIG. 9 shows an observation image obtained by the microscopic observation.

From the graph shown in FIG. 8, it can be seen that the iron powder contained in an amount corresponding to about $1.4\times10^{-4}$ V before processing decreases to an amount corresponding to about $0.2\times10^{-4}$ V by conducting the process described above just once. Therefore, it can be seen that for the slurry-like mixture S used in this experiment, most of the iron powder is removed from the slurry-like mixture S only by conducting the process according to this modified example just once.

From the observation image shown in FIG. 9, it can be seen that there is little iron powder left in the processed slurry-like mixture S. It is also seen that plenty of the diamond particles remain in the processed slurry-like mixture S.

1-6. Modified Example 3

Figure 10:
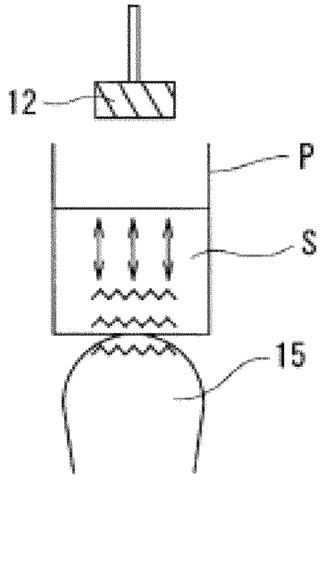
FIG. 10 is a vertical section view showing a processing apparatus used in a method for processing a mixture according to the modified example 3 of the first embodiment.

In the processing method, ultrasonic wave vibration was given to the slurry-like mixture S using the ultrasonic generator 11. In place of this, vertical vibration may be given to the slurry-like mixture S using a vertical vibration generator 15 as shown in FIG. 10. In the example shown in FIG. 10, the permanent magnet 12 can be immersed into the slurry-like mixture S, and the permanent magnet 12 is located in the moving part 131 of the elevator 13 likewise the case of the processing apparatus 1 as shown in FIG. 1, for example.

Since the aggregates of the nonmagnetic material particles and the magnetic material particles present in the slurry-like mixture S vibrate by applying a vertical vibration to the slurry-like mixture S, the binding between the nonmagnetic material particles and the magnetic material particles is weakened or cancelled, and thus the aggregates are broken down and the nonmagnetic material particles and the magnetic material particles are dispersed in the slurry-like mixture S.

Following the dispersion of the magnetic material particles, by immersing the permanent magnet 12 into the slurry-like mixture S in the container P, the dispersed magnetic material particles receive the magnetic force Fm from the permanent magnet 12 and are placed on one site in the slurry-like mixture S.

The inventor of the present application made an experiment of separating and removing magnetic material particles using the processing method, and confirmed that the magnetic material particles can be removed from the slurry-like mixture S while leaving the nonmagnetic material particles in the slurry-like mixture S. Here, a slurry-like mixture S including diamond particles, semiconductor removed powder and iron powder (magnetic material particles) which are suspended in viscous alcohol was used as an experimental object.

In the present experiment, 80 mL of the slurry-like mixture S was poured into the container P, and vertical vibration was applied to the container P by the vertical vibration generator 15. Here, a neodymium magnet was used as the permanent magnet 12 and the maximum value of magnetic flux density was about 0.3 T on its surface.

Figure 11:
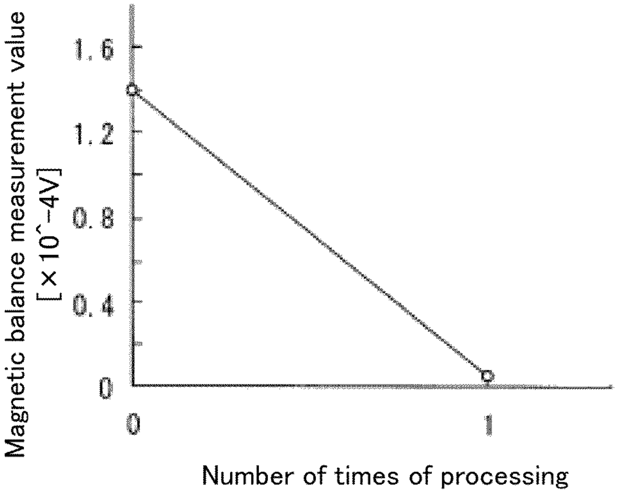
FIG. 11 is a graphic representation of the relation between the number of times of processing and a value measured by the magnetic balance in case that the processing method is applied to a slurry-like mixture.

Then slurry-like mixture S was collected after processing, and an amount of iron powder contained therein was measured by a magnetic balance. FIG. 11 shows the results.

From the graph shown in FIG. 11, it can be seen that the iron powder contained in an amount corresponding to about $1.4\times10^{-4}$ V before the process decreases to an amount corresponding to about $0.1\times10^{-4}$ V by conducting the process described above just once. Therefore, it can be seen that for the slurry-like mixture S used in the present experiment, most of the iron powder is removed from the slurry-like mixture S only by conducting the process according to the present modified example just once.

1-7. Modified Example 4

In the processing method, the magnetic field is applied to the slurry-like mixture S using the permanent magnet 12. In place of this, the magnetic field may be applied to the slurry-like mixture S using a superconducting magnet. In this case, a processing apparatus 3 shown in FIG. 12 is used for the process of the slurry-like mixture S.

Figure 12:
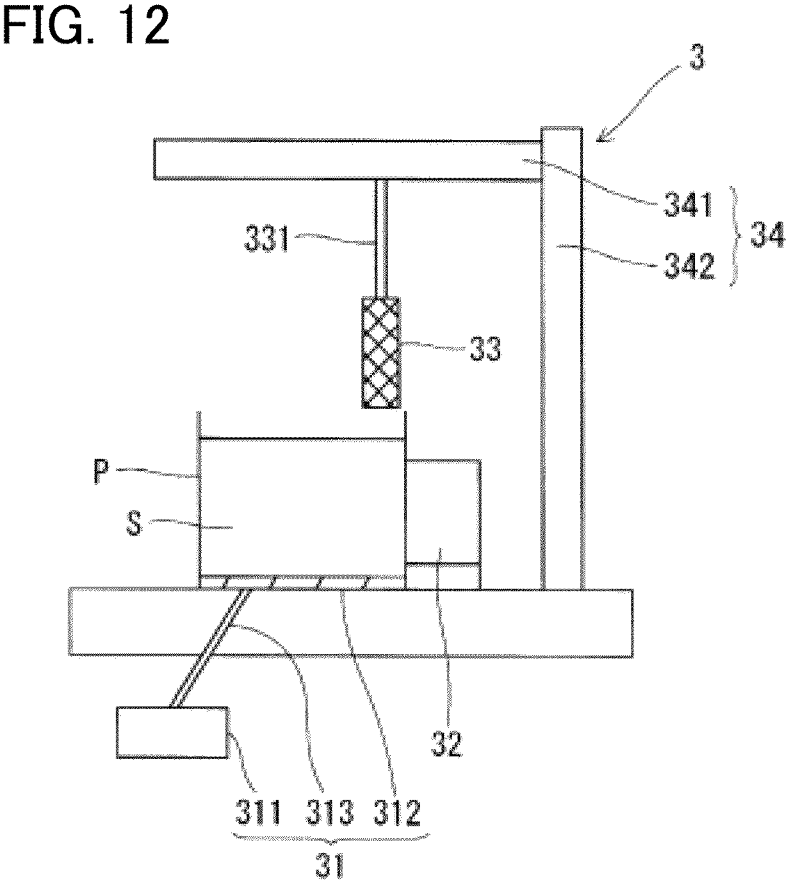
FIG. 12 is a vertical section view showing a processing apparatus used in a method for processing a mixture according to the modified example 4 of the first embodiment.

The processing apparatus 3 shown in FIG. 12 includes an ultrasonic generator 31, a superconducting, magnet 32, filament 33, and an elevator 34. The ultrasonic generator 31 includes a vibration generating part 311 for generating ultrasonic wave vibration, a vibration base 312, and a transmission member 313 for transmitting ultrasonic wave vibration from the vibration generating part 311 to the vibration base 312, and a container P containing the slurry-like mixture S which is put on the top face of the vibration base 312. Thus, the ultrasonic wave vibration generated in the vibration generating part 311 is transmitted to the slurry-like mixture S in the container P via the transmission member 313 and the vibration base 312.

The superconducting magnet 32 is located so as to be close to or in contact with the lateral face wall of the container P put on the top face of the vibration base 312. Therefore, the magnetic field is applied to the slurry-like mixture S in the container P from the lateral side by the superconducting magnet 32.

The magnitude of the external magnetic field H generated by the superconducting magnet 32 is preferably equal to or larger than the saturation magnetic field in which the magnetization of the magnetic material particles saturates. For example, in case that the magnetic material particles in the slurry-like mixture S are iron powder, and are spherical, magnetization M of the magnetic material particle saturates when the value of magnetic flux density ($=\mu0\cdot H$ ($\mu0$ is permeability of vacuum)) corresponding to the external magnetic field H is about 0.7 T. Therefore, it is preferred to use as the superconducting magnet 32 one capable of generating an external magnetic field H having a magnetic flux density of about 0.7 T.

When the superconducting magnet 32 generates the external magnetic field H having a larger magnitude than the saturated magnetic field, the external magnetic field H exerts over a wide range in the slurry-like mixture S. Hence, the magnetic force Fm which is larger than the drag force Fd exerts on much more magnetic material particles compared to the case where the permanent magnet 12 described above is used.

The elevator 34 comprises a moving part 341 capable of reciprocally moving in the vertical direction, and a support base 342 for supporting the moving part 341, and the filament 33 is located in a distal end of a bar-shaped member 331 extending downward from the moving part 341. The filament 33 is formed of a magnetic material.

Figure 13:
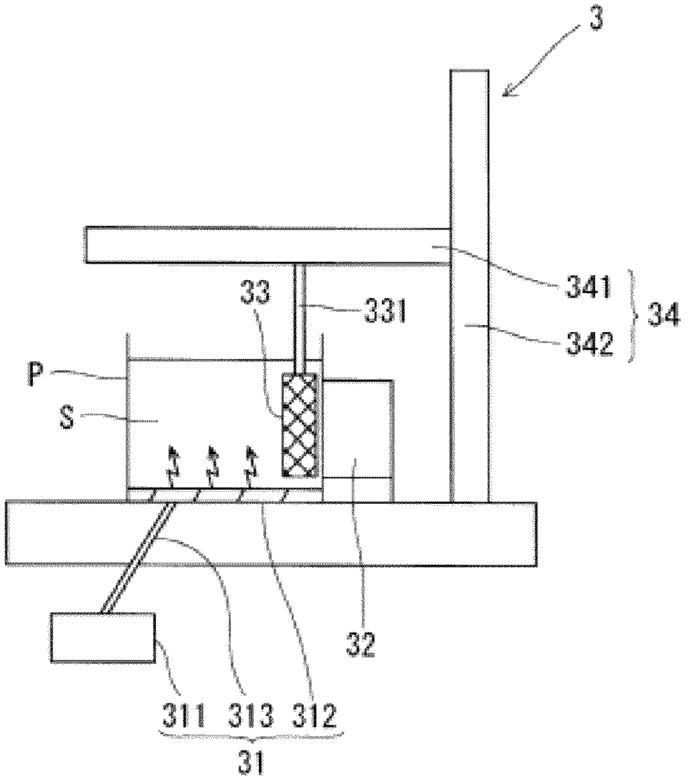
FIG. 13 is a vertical section view for illustrating a method for processing a mixture by the processing apparatus.

In the processing apparatus 3, as shown in FIG. 13, the filament 33 can be immersed into the slurry-like mixture S in the container P by lowering the moving part 341 of the elevator 34.

On the contrary, as shown in FIG. 12, the filament 33 can be taken out of the slurry-like mixture S in the container P by elevating the moving part 341 of the elevator 34.

As shown in FIG. 13, by immersing the filament 33 into the slurry-like mixture S, the filament 33 is positioned in the magnetic field applied to the slurry-like mixture S by the superconducting magnet 32, and as a result, a magnetic filter is formed. Therefore, a magnetic gradient arises in the magnetic field in the slurry-like mixture S. In this case, since the gradient dH/dx of the external magnetic field H becomes larger, the magnetic force Fm exerted on the magnetic material particles also becomes larger (see formula 2). Therefore, when the magnetic material particles have a small particle diameter (radius b), the magnetic force Fm which is larger than the drag force Fd is more likely to be exerted.

A method of processing slurry-like mixture S using the processing apparatus 3 will be described. First, as shown in FIG. 12, the container P containing the slurry-like mixture S is put on the top face of the vibration base 312 of the ultrasonic generator 31.

In this phase, the nonmagnetic material particles and the magnetic material particles in the slurry-like mixture S bind each other to form aggregates.

Then, an ultrasonic wave is generated by the ultrasonic generator 31, and ultrasonic wave vibration is applied to the slurry-like mixture S. Since the aggregates of the nonmagnetic material particles and the magnetic material particles present in the slurry-like mixture S strongly vibrate because of this ultrasonic wave vibration, the binding between the nonmagnetic material particles and the magnetic material particles is weakened or cancelled, and thus the aggregates are broken down and the nonmagnetic material particles and the magnetic material particles are dispersed in the slurry-like mixture S.

During the time when an ultrasonic wave is generated by the ultrasonic generator 31, the dispersed state of the nonmagnetic material particles and the magnetic material particles is maintained.

After dispersing the nonmagnetic material particles and the magnetic material particles in the slurry-like mixture S by the ultrasonic generator 31, the moving part 341 of the elevator 34 is lowered as shown in FIG. 13, and the filament 33 is immersed into the slurry-like mixture S in the container P. Then a magnetic field is applied to the slurry-like mixture S by the superconducting magnet 32. At this time, the ultrasonic wave vibration is continuously applied to the slurry-like mixture S by the ultrasonic generator 31.

In this manner, a magnetic field is applied to the slurry-like mixture S by the superconducting magnet 32, while the ultrasonic wave vibration is applied to the slurry-like mixture S by the ultrasonic generator 31.

The superconducting magnet 32 exerts a magnetic field on a wide range in the slurry-like mixture S as described above, and hence the magnetic force Fm is exerted on plenty of the magnetic material particles including magnetic material particles having a small radius b. Therefore, much more magnetic material particles are adsorbed to the surface of the filament 33 compared to the method of processing the slurry-like mixture S using the processing apparatus 1 (see FIG. 1), and as a result, plenty of the magnetic material particles are placed on one site in the slurry-like mixture S.

Thereafter, the magnetic field of the superconducting magnet 32 is weakened. Then the moving part 341 of the elevator 34 is elevated, and the filament 33 is taken out of the slurry-like mixture S in the container P. As a result, plenty of the magnetic material particles are removed from the slurry-like mixture S. At this time, most of the nonmagnetic material particles remain in the slurry-like mixture S.

Therefore, according to the processing method of the present modified example, plenty of the magnetic material particles can be removed from the slurry-like mixture S while leaving most of the nonmagnetic material particles in the slurry-like mixture S.

Most of the magnetic material particles present in the slurry-like mixture S are separated and removed by executing the processing method according to this modified example at least once for the slurry-like mixture S, and as a result, a recyclable slurry is obtained.

Further, particles of diamond or silicon carbide and the like, and removed powder generated from semiconductor or the like can be separately taken out by conducting centrifugation on the slurry after processing, and hence, the recycling of these nonmagnetic material particles is enabled.

In the processing apparatus 3, the filament 33 is used to generate a magnetic gradient in the magnetic field in the slurry-like mixture S. Instead of using the filament 33, only the external magnetic field H generated by the superconducting magnet 32 may be used to exert the magnetic force Fm on the magnetic material particles. Also in this case, plenty of the magnetic material particles in the slurry-like mixture S can be separated and removed.

By using the filament 33 as described above, it is possible to remove the magnetic material particles having a small particle diameter.

In the processing apparatus 3, the filament 33 is used to generate the magnetic gradient in the magnetic field in the slurry-like mixture S. Another magnetic gradient generating means may be employed in place of the filament 33.

1-8. Modified Example 5

The above-described processing method according to the first embodiment may be applied not only to the slurry-like mixture S including the nonmagnetic material particles and the magnetic material particles suspended in a liquid (fluid medium) but also to a mixture or the like including two kinds of nonmagnetic material particles or magnetic material particles suspended in a liquid. That is, the processing method can be applied to a mixture having first particles and second particles that are made of either a magnetic material or a nonmagnetic material and suspended in a liquid (fluid medium).

After applying ultrasonic wave vibration to the mixture to disperse the first particles and the second particles in the mixture, a magnetic field is applied to the mixture by a permanent magnet or a superconducting magnet. The first particles are subjected to a magnetic force Fm1 represented by the following formula 5 and the second particles are subjected to a magnetic force Fm2 represented by the following formula 6. Here, the first particles have a spherical shape with a radius of b1, and the second particles have a spherical shape with a radius of b2. Furthermore, the magnetizations of the first and the second particles are represented by the symbols M1 and M2, respectively.

$$Fm1 = \frac{4}{3}\pi(b1)^3 M1 \cdot \frac{dH}{dx} \tag{5}$$

$$Fm2 = \frac{4}{3}\pi(b2)^3 M2 \cdot \frac{dH}{dx} \tag{6}$$

On the other hand, the first particles in the mixture receive a drag force. Fd1 represented by the formula 7, and the second particles in the mixture receive a drag force Fd2 represented by the formula 8. Here, the velocities of the first and the second particles are represented by symbols Vp1 and Vp2, respectively.

$$Fd1 = 6\pi\eta b1(Vf - Vp1) \tag{7}$$

$$Fd2 = 6\pi\eta b2(Vf - Vp2) \tag{8}$$

Adjustment of Magnetic Force and Drag Force

By adjusting the magnitude relationships between the magnetic forces Fm1 and Fm2 and the drag forces Fd1 and Fd2, it is possible to separate the first particles and the second particles from each other.

First Example

A case where the first particles and the second particles are the same kind of particles (magnetic material particles or nonmagnetic material particles) and the volumes of the first and second particles are different from each other will be described.

In this case, by adjusting the external magnetic field H and the velocity Vf of the liquid (fluid medium), the magnetic force Fm1 applied to the first particles is made larger than the drag force, and the magnetic force Fm2 applied to the second particles is made smaller than the drag force Fd2 (Fm1>Fd1, Fd2>Fm2).

As a result, by applying the magnetic force Fm1, the first particles remain at a predetermined site (such as the surface of the permanent magnet) in the mixture against the drag force Fd1, and the second particles are flown out of the predetermined site by the drag force Fd2 received from the liquid (fluid medium). Therefore, the first particles and the second particles are separated from each other.

Incase that the magnetic force Fm1 applied to the first particles is larger than the magnetic force Fm2 applied to the second particles (the case of Fm1>Fm2), it is possible to separate either the first particles or the second particles from the mixture by applying a gravitational force even if the liquid (fluid medium) rests and both the drag forces Fd1 and Fd2 of the first particles and the second particles are zero.

Second Example

The case where the first particles and the second particles are different kinds of particles (magnetic material particles and nonmagnetic material particles) and the volumes of the both first and second particles are equivalent will be described.

In this case, since the drag force Fd1 received by the first particles and the drag force Fd2 received by the second particles are equal to each other, by adjusting the external magnetic field H, the magnetic force Fm1 applied to the first particles is made larger than the drag force Fd1, and the magnetic force Fm2 applied to the second particles is made smaller than drag force Fd1 (Fm1>Fd1 (=Fd2)>Fm2).

As a result, the first particles are placed on a predetermined site (such as a surface of permanent magnet) in the mixture against the drag force Fd1 by being subjected to the magnetic force Fm1, and the second particles are flown from the predetermined site by the drag force Fd2 received from the liquid (fluid medium). Thus, the first particles and the second particles are separated from each other.

Adjustment of Magnetic Field or Magnetic Gradient

When the first particles and the second particles are of the same kind, having the same magnetization (magnetic material particles or nonmagnetic material particles), and have different volumes, by varying the external magnetic field H depending on the location in the mixture, a large magnetic force applied to the particles having a larger volume even at a location where the external magnetic field H or the magnetic gradient is small, while a large magnetic force applied to the particles having a smaller volume only at the location where the external magnetic field H or the magnetic gradient is large. Therefore, the first particles and the second particles are placed on different locations.

When the first particles and the second particles are of the same kind or of different kinds and have different magnetizations (for example, two kinds of paramagnetic material particles having different magnetizations, two kinds of magnetic material particles having different magnetizations, paramagnetic material particles and magnetic material particles, paramagnetic material particles and diamagnetic material particles, and so on), and these particles have the same volume, it is possible to separate the first particles and the second particles using a difference between magnetization M1 of the first particles and magnetization M2 of the second particles.

In the case where both the first particles and the second particles are magnetic material particles, the magnetizations of the first and second particles are saturated when the magnetic field is a predetermined value or more. When the magnetizations of the first and second particles are saturated, the first particles and the second particles are separated from each other using the difference between the saturated magnetization of the first particles and the saturated magnetization of the second particles.

Further, when several kinds of magnetic material particles and nonmagnetic material particles having different volumes by kind of particles are contained in the mixture, it is possible to separate the various kinds of magnetic material particles and nonmagnetic material particles by kind by adjusting the magnetic field or the magnetic gradient in accordance to the volumes or magnetizations of these particles.

Processing Experiment of Mixture

In the case where both the first particles and the second particles are magnetic material particles, the inventor of the present application experimentally confirmed that the first particles and the second particles can be separated from each other by using the difference between the saturated magnetization of the first particles and the saturated magnetization of the second particles as described above.

Experimental Method

Figure 38:
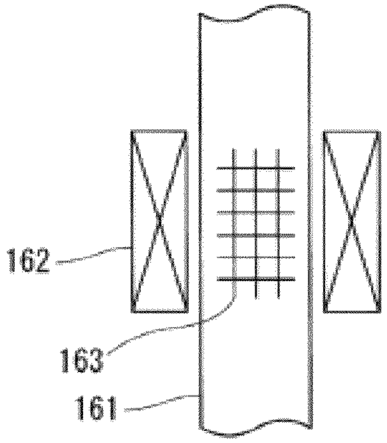
FIG. 38 is a section view showing an experimental apparatus used in a processing experiment for a mixture as described in the modified example 5 of the first embodiment of the present invention.

As shown in FIG. 38, an apparatus having a flow channel 161 through which a slurry-like mixture S flows, a superconducting magnet 162, and a magnetic filter 163 was used as an experimental apparatus. In this experimental apparatus, the flow channel 16 is partially inserted in the superconducting magnets 62, and the magnet filter is located in the flow channel 161 at a location within the superconducting magnet 162. The experimental apparatus further includes dispersing means which is not shown in the drawing, e.g., an ultrasonic generator, for dispersing the slurry-like mixture S flowing in the flow channel 161, and hence the slurry-like mixture S having been subjected to a dispersion process flows in the flow channel 161.

A slurry-like mixture S including first particles and second particles which are both stainless steel powder prepared by an atomizing method and suspended in polyvinyl alcohol having a viscosity of about 1 Pa·s was used as an experimental object. Each of the first particles was sufficiently, totally martensitic transformed, and each of the second particles was partially martensitic transformed. Here, both the first particles and the second particles have a particle diameter of about 30 μm. The first particles have a saturated magnetization per unit mass of about 70 to 80 $A \cdot m^2/kg$, and the second particles have a saturated magnetization per unit mass of about 10 $A \cdot m^2/kg$.

In the present experiment, a mesh having a line diameter of about 0.3 mm was used as the magnetic filter 163. While the slurry-like mixture S was subjected to a dispersing process by the dispersing means and the magnetic field of about 2 T was generated by the superconducting magnet 162, the slurry-like mixture S was flowed in the flow channel 161 at a flow rate of 3 mm/s. Then the processed slurry-like mixture S discharged from the flow channel 16 was collected, amounts of the first particles and the second particles contained therein were measured by a magnetic balance, and weight percentages (separation ratios) of the first particles and the second particles contained in the processed slurry-like mixture S relative to the first particles and the second particles contained in the unprocessed slurry-like mixture S were respectively determined.

Experimental Result

As a result of the experiment, the separation ratio of the first particles was 0 to 5%, and the separation ratio of the second particles was 98 to 100%. The significantly small separation ratio of the first particles is attributable to the fact that when the first particles and the second particles pass through the magnetic field generated by the superconducting magnet 162, a large magnetic force is applied to the first particles having a large saturated magnetization, and as a result, the first particles are captured by the superconducting magnet 162. On the other hand, the significantly large separation ratio of the second particles is attributable to the fact that only a small magnetic force is applied to the second particles having a small saturated magnetization, and hence most of the second particles pass through the magnetic field generated by the superconducting magnet 162 and are discharged from the flow channel 161.

As seen above, it was demonstrated that the first particles and the second particles can be separated from each other utilizing the difference between the saturated magnetization of the first particles and the saturated magnetization of the second particles in the case that both the first particles and the second particles are magnetic material particles.

2. Second Embodiment

The processing method according to this embodiment is a method of processing a mixture having first particles made of a magnetic material or a nonmagnetic material and second particles made of a magnetic material or a nonmagnetic material wherein the second particles are mixed in a fluid medium containing the first particles. For example, it may be applied to a slurry-like mixture S including magnetic material particles that are mixed in a slurry including nonmagnetic material particles suspended in a liquid (fluid medium). Here, the magnetic material includes a ferromagnetic material, and the nonmagnetic material includes a paramagnet material and a diamagnetic material.

In the following, an embodiment of processing the slurry-like mixture S will be described.

2-1. Processing Apparatus for Mixture

Figure 14:
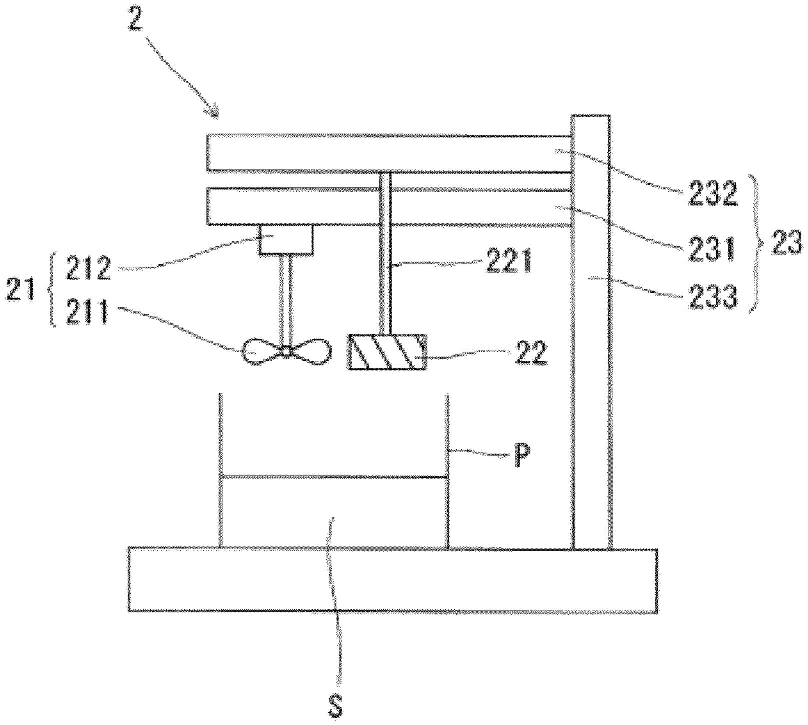
FIG. 14 is a vertical section view showing a processing apparatus used in a method for processing a mixture according to a second embodiment of the present invention.

The processing method according to this embodiment is executed by using a processing apparatus 2 shown in FIG. 14. The processing apparatus 2 comprises a stirrer 21, a permanent magnet 22 and an elevator 23. The elevator 23 includes two moving parts 231 and 232 capable of reciprocally moving in a vertical direction, and a support base 233 for supporting the moving parts 231 and 232.

The stirrer 21 includes a stirring propeller 211 and a motor 212 for rotating the stirring propeller 211. The stirrer 21 is installed to the moving part 231 of the elevator 23 so that the stirring propeller 211 is directed downward.

Figure 15:
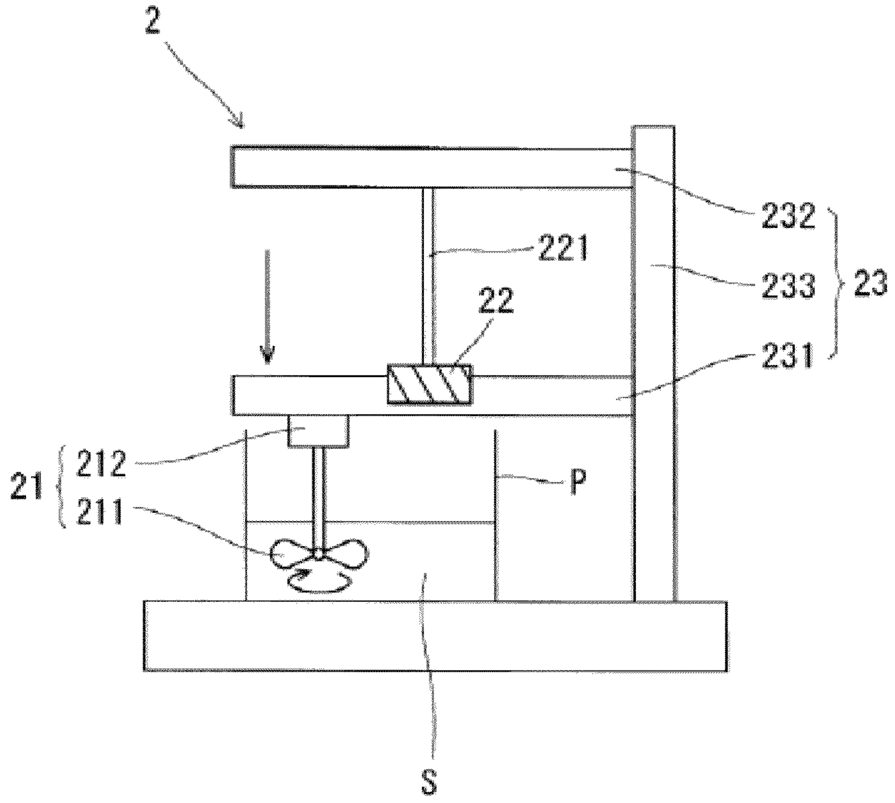
FIG. 15 is a vertical section view for illustrating the dispersion step in the process method for a mixture by the processing apparatus.

In the processing apparatus 2, after placing the container P containing the slurry-like mixture S below the stirrer 21, the stirring propeller 211 of the stirrer 2 can be immersed into the slurry-like mixture S in the container P by lowering the moving part 231 of the elevator 23, as shown in FIG. 15.

On the contrary, as shown in FIG. 14, the stirring propeller 211 of the stirrer 21 can be taken out of the slurry-like mixture S in the container P by elevating the moving part 231 of the elevator 23.

The permanent magnet 22 is located in the distal end of a bar-shaped member 221 extending downward from the moving part 232 of the elevator 23. A permanent magnet having a magnetic flux density of various magnitudes may be used as the permanent magnet 22.

Figure 16:
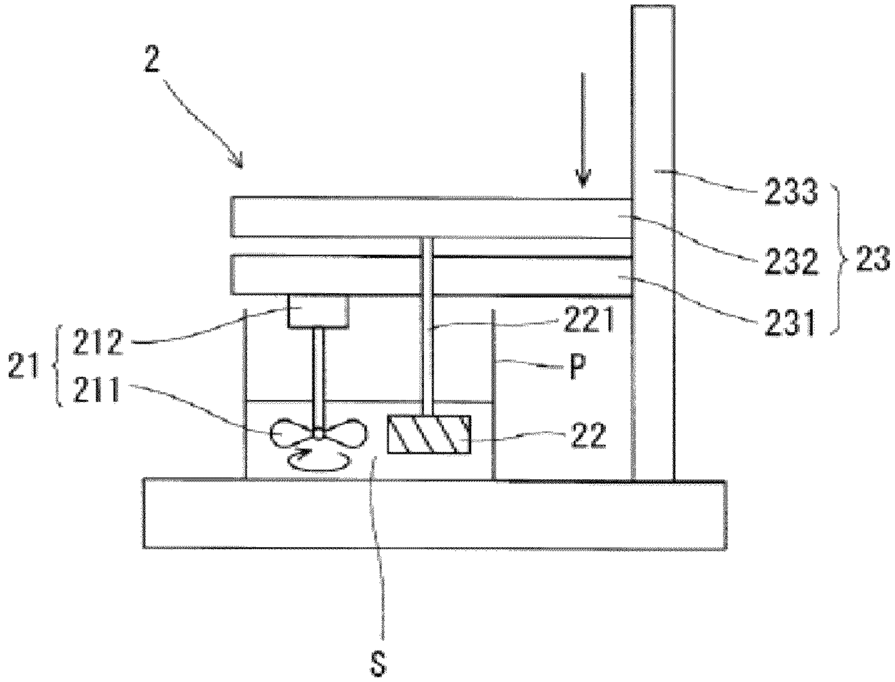
FIG. 16 is a vertical section view for illustrating the magnetic separation step in the process method for a mixture by the processing apparatus.

In the processing apparatus 2, when the container P containing the slurry-like mixture S is placed below the permanent magnet 22, the permanent magnet 22 can be immersed into the slurry-like mixture S in the container P by lowering the moving part 232 of the elevator 23, as shown in FIG. 16.

Figure 19:
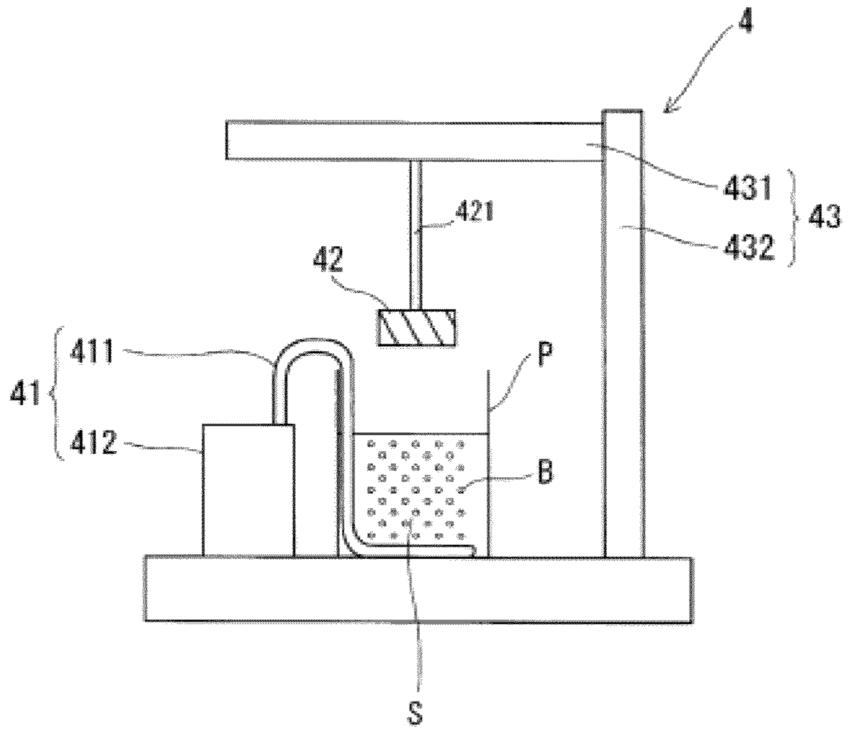
FIG. 19 is a vertical section view showing a processing apparatus used in a method for processing a mixture according to a third embodiment of the present invention.

On the contrary, as shown in FIG. 19, the permanent magnet 22 can be taken out of the slurry-like mixture S in the container P by elevating the moving part 232 of the elevator 23.

2-2. Processing Method for Mixture

A method of processing the slurry-like mixture S using the processing apparatus 2 will be described. First, as shown in FIG. 14, the container P containing the slurry-like mixture S is placed below the stirrer 21 and the permanent magnet 22.

In this phase, the nonmagnetic material particles and the magnetic material particles in the slurry-like mixture S bind each other to form aggregates.

Next, the stirring propeller 211 of the stirrer 21 is immersed into the slurry-like mixture S in the container P by lowering the moving part 231 of the elevator 23 as shown in FIG. 15. The motor 212 of the stirrer 2 is driven to rotate the stirring propeller 211. Then, the slurry-like mixture S is stirred by the stirring propeller 211, and the binding between the nonmagnetic material particles and the magnetic material particles is weakened or cancelled. As a result, the aggregates are broken down and therefore, the nonmagnetic material particles and the magnetic material particles are dispersed in the slurry-like mixture S.

During the time when the slurry-like mixture S is stirred by the stirrer 2, the dispersed state of the nonmagnetic material particles and the magnetic material particles is maintained.

After dispersing the nonmagnetic material particles and the magnetic material particles the stirrer 21 in the slurry-like mixture S, the permanent magnet 22 is immersed into the slurry-like mixture S in the container P by lowering the moving part 232 of the elevator 23 as shown in FIG. 16. At this time, the slurry-like mixture S is continuously stirred by the stirrer 21.

Thus, a magnetic field is applied to the slurry-like mixture S by the permanent magnet 22, while the slurry-like mixture S is stirred by the stirrer 21.

The magnetic material particles in the slurry-like mixture S are subjected to a magnetic force Fm from the permanent magnet 22 by immersing the permanent magnet 22 in the slurry-like mixture S. The magnetic material particles are adsorbed to the surface of the permanent magnet 22, and as a result, the magnetic material particles are placed on one site in the slurry-like mixture S.

Then the moving part 232 of the elevator 23 is elevated, and the permanent magnet 22 is taken out of the slurry-like mixture S in the container P. As a result, the magnetic material particles are removed from the slurry-like mixture S. At this time, most of the nonmagnetic material particles remain in the slurry-like mixture S.

Therefore, due to the aforementioned processing method, the magnetic material particles can be removed from the slurry-like mixture S while leaving most of the nonmagnetic material particles in the slurry-like mixture S.

By conducting the aforementioned processing method on the slurry-like mixture S once or several times, most of the magnetic material particles present in the slurry-like mixture S are separated and removed, and as a result, a recyclable slurry is obtained.

Further, by centrifuging the processed slurry, it is possible to take out particles of diamond, silicon carbide or the like, and removed powder caused from a semiconductor or the like separately, and as a result, the recycling of these nonmagnetic material particles is enabled.

2-3. Processing Experiment of Mixture

The inventor of the present application carried out an experiment of separating and removing the magnetic material particles using the processing method according to the second embodiment, and confirmed that the magnetic material particles can be removed from the slurry-like mixture S while leaving the nonmagnetic material particles in the slurry-like mixture S.

Experimental Method

A slurry-like mixture S including diamond particles and removed powder of semiconductor and iron powder (magnetic material particles) which are suspended in viscous alcohol was used as an experimental object.

In this experiment, 300 mL of the slurry-like mixture S was poured into the container P. The rotation speed of the stirring propeller 211 of the stirrer 21 was set to 500 rpm. A neodymium magnet was used as the permanent magnet 22 and the maximum value of magnetic flux density was about 0.3 T on its surface.

The slurry-like mixture Sin the container P was stirred by the stirrer 21, and the nonmagnetic material particles and the magnetic material particles were dispersed in the slurry-like mixture S. Thereafter, the permanent magnet 22 was immersed into the slurry-like mixture S in the container P for 30 seconds while the slurry-like mixture S was stirred. The permanent magnet 22 was then taken out of the slurry-like mixture S.

Thereafter, 5 mL of the processed slurry-like mixture S was collected, and an amount of iron powder contained therein was measured by a magnetic balance.

Figure 17:
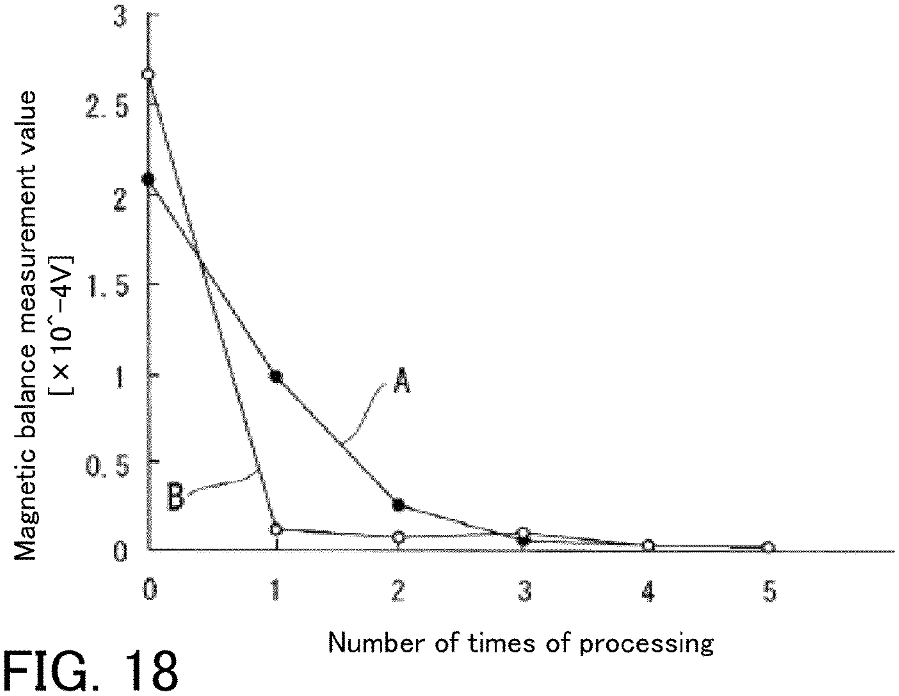
FIG. 17 is a graphic representation of the relation between the number of times of processing and a value measured by the magnetic balance in case that the processing method is applied to a slurry-like mixture.

Furthermore, in this experiment, the step of the separation and removal of the iron powder was repeated five times for the same slurry-like mixture S, and the amount of the iron powder was measured by a magnetic balance every time. In FIG. 17, the results are shown by graph A. By comparison, FIG. 17 also includes a graph B (FIG. 3) which is a result of the process experiment carried out using the processing method according to the first embodiment.

Figure 18:
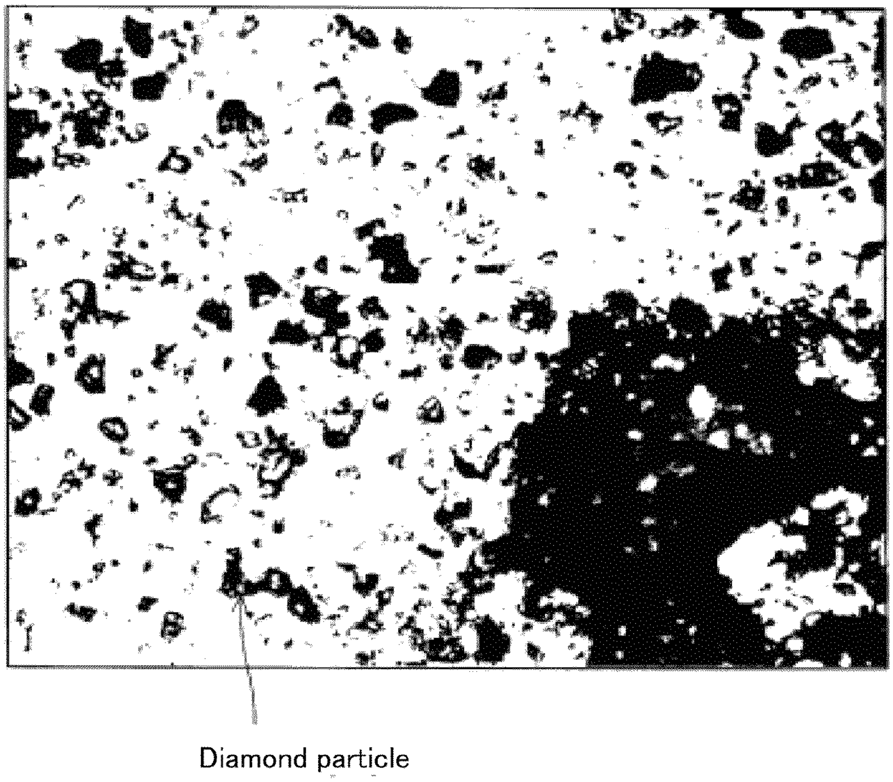
FIG. 18 is a view showing a microscopic observation image of a slurry-like mixture after processing it.

For the processed slurry-like mixture S (after five repetitions of the step of the separation and removal of iron powder), centrifugation was conducted at a rotation speed of 1500 rpm for 15 minutes to separate and remove the removed powder of the semiconductor from the slurry-like mixture S. Then microscopic observation was conducted for the slurry-like mixture S from which the removed powder of semiconductor had been removed. FIG. 18 shows an observation image obtained by the microscopic observation.

Experimental Result

From the graph A shown in FIG. 17, it can be seen that by conducting the aforementioned process three times, the iron powder decreases from an amount corresponding to about $2.1\times10^{-4}$ V before processing to an amount corresponding to about $0.1\times10^{-4}$ V. The observation image shown in FIG. 18 reveals that there is little iron powder remaining in the processed slurry-like mixture S. This also reveals that plenty of the diamond particles remain in the slurry-like mixture S after the process. Therefore, it was confirmed that by using the processing method according to the present embodiment, the iron powder can be removed from the slurry-like mixture S while leaving the diamond particles in the slurry-like mixture S.

Comparison between the graph A and graph B shown in FIG. 17 reveals that in the case where ultrasonic wave vibration is given to the slurry-like mixture S, the amount of the magnetic material particles in the slurry-like mixture S decreases to an amount corresponding to about $0.1\times10^{-4}$ V by a smaller number of processing times, compared to this experiment where the slurry-like mixture S is stirred. This is attributed to the fact that when the ultrasonic wave vibration is applied to the slurry-like mixture S, binding between the nonmagnetic material particles and the magnetic material particles in the slurry-like mixture S are more likely to be weakened and hence the aggregates of the nonmagnetic material particles and the magnetic material particles are more likely to be broken down, compared to stirring the slurry-like mixture S.

2-4. Modified Example

In the processing method, when the dispersed state of the nonmagnetic material particles and the magnetic material particles is maintained after stopping stirring of the slurry-like mixture S, the magnetic field may be applied after stopping the stirring.

Also in this embodiment, a magnetic field may be applied to the slurry-like mixture S using a superconducting magnet in place of the permanent magnet 22, as described for the modified example 4 of the first embodiment.

Further, as described for the modified example 5 of the first embodiment, the processing method according to the present embodiment can be applied not only to the slurry-like mixture S including nonmagnetic material particles and magnetic material particles which are suspended in a liquid (fluid medium) but also to a mixture including first particles and second particles that are made of either a magnetic material or a nonmagnetic material and suspended in a liquid (fluid medium).

3. Third Embodiment

The processing method according to the present embodiment is a method of processing a mixture having first particles made of a magnetic material or a nonmagnetic material and second particles made of a magnetic material or a nonmagnetic material wherein the second particles are mixed in a fluid medium containing the first particles. For example, it may be applied to a slurry-like mixture S including magnetic material particles that are mixed into a slurry including nonmagnetic material particles suspended in a liquid (fluid medium). Here, the magnetic material includes a ferromagnetic material, and the nonmagnetic material includes a paramagnet material and a diamagnetic material.

In the following, an embodiment of processing the slurry-like mixture S will be described.

3-1. Processing Apparatus for Mixture

The processing method according to the present embodiment is executed by using a processing apparatus 4 shown in FIG. 19. The processing apparatus 4 includes an air bubble generator 41, a permanent magnet 42, and an elevator 43. The air bubble generator 41 includes a tube 411 formed with a plurality of air holes in the distal end part, and a pump that pushes the air through the air holes by sending the air into the tube 411.

The distal end part of the tube 411 of the air bubble generator 41 is provided in the container P, and air bubbles B are generated in the slurry-like mixture S in the container P by pushing the air through the air holes formed in the distal end part.

The elevator 43 comprises a moving part 431 capable of reciprocally moving in the vertical direction, and a support base 432 for supporting the moving part 431, and the permanent magnet 42 is installed in the distal end of a bar-shaped member 421 extending downwardly from the moving part 431. A permanent magnet having a magnetic flux density of various magnitudes may be used as the permanent magnet 42.

Figure 20:
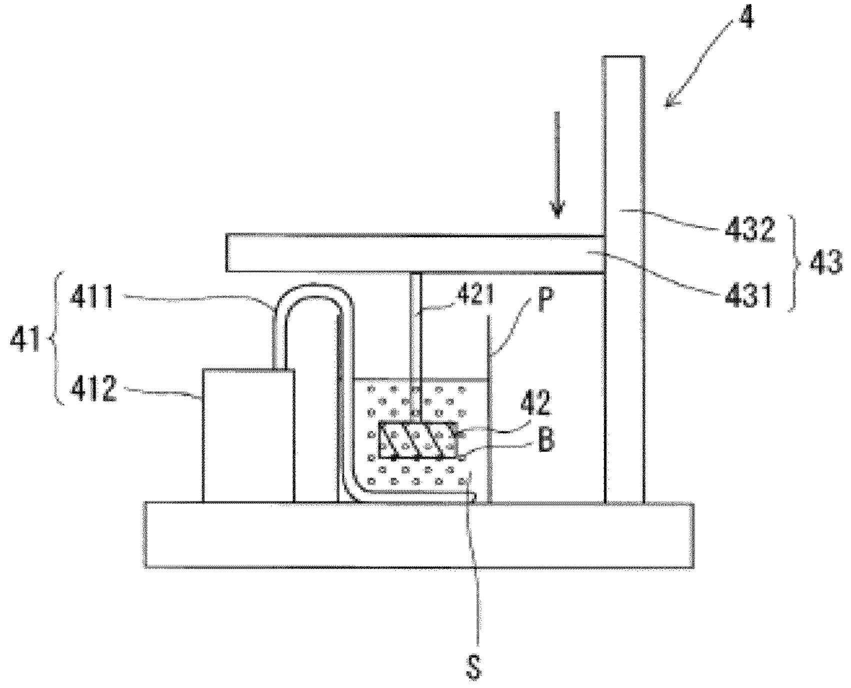
FIG. 20 is a vertical section view for illustrating a method for processing a mixture by the processing apparatus.

In the processing apparatus 4, after placing the container P containing the slurry-like mixture S below the permanent magnet 42, the permanent magnet 42 can be immersed into the slurry-like mixture S in the container P by lowering the moving part 431 of the elevator 43, as shown in FIG. 20.

On the contrary, as shown in FIG. 19, the permanent magnet 42 can be removed from the slurry-like mixture S in the container P by elevating the moving part 431 of the elevator 43.

3-2. Processing Method for Mixture

A method of processing the slurry-like mixture S using the processing apparatus 4 will be described. First, as shown in FIG. 19, the container P containing the slurry-like mixture S is placed below the permanent magnet 42.

In this phase, the nonmagnetic material particles and the magnetic material particles in the slurry-like mixture S bind each other to form aggregates.

Next, by driving the air bubble generator 41, air bubbles B are generated in the slurry-like mixture S as shown in FIG. 19. Since the aggregates of the nonmagnetic material particles and the magnetic material particles present in the slurry-like mixture S are shaken by the generated air bubbles B, the binding between the nonmagnetic material particles and the magnetic material particles is weakened or cancelled, and as a result, the aggregates are broken down and the nonmagnetic material particles and magnetic material particles are dispersed in the slurry-like mixture S.

During the time when the air bubbles B are generated by the air bubble generator 41, the dispersed state of the nonmagnetic material particles and the magnetic material particles is maintained.

After dispersing the nonmagnetic material particles and the magnetic material particles in the slurry-like mixture S by the air bubble generator 41, the permanent magnet 42 is immersed into the slurry-like mixture S in the container P by lowering the moving part 431 of the elevator 43 as shown in FIG. 20. At this time, the air bubbles B are continuously generated in the slurry-like mixture S by the air bubble generator 41.

By immersing the permanent magnet 42 into the slurry-like mixture S, the magnetic material particles in the slurry-like mixture S are subjected to a magnetic force Fm of the permanent magnet 42 and adsorbed to the surface of the permanent magnet 42, and as a result, the magnetic material particles are placed on one site in the slurry-like mixture S.

Thereafter, the moving part 431 of the elevator 43 is elevated, and the permanent magnet 42 is taken out of the slurry-like mixture S in the container P. As a result, the magnetic material particles are removed from the slurry-like mixture S. At this time, most of the nonmagnetic material particles remain in the slurry-like mixture S.

Therefore, due to the aforementioned processing method, the magnetic material particles can be removed from the slurry-like mixture S while leaving most of the nonmagnetic material particles in the slurry-like mixture S.

By conducting the processing method described above once or repeating several times for the slurry-like mixture S, most of the magnetic material particles present in the slurry-like mixture S are separated and removed, resulting that a recyclable slurry is obtained.

Further, by conducting centrifugation on the slurry after the process, it is possible to take out the particles of diamonds, silicon carbide or the like, and removed powder generated from semiconductor or the like separately, so that the recycling of these nonmagnetic material particles is enabled.

3-3. Processing Experiment for Mixture

The inventor of the present application carried out an experiment of separating and removing magnetic material particles using the processing method according to the third embodiment, and confirmed that magnetic material particles can be removed from the slurry-like mixture S while leaving nonmagnetic material particles in the slurry-like mixture S.

Experimental Method

A slurry-like mixture S including diamond particles, removed powder of semiconductor and iron powder (magnetic material particles) which are suspended in viscous alcohol was used as an experimental object.

In this experiment, 600 mL of the slurry-like mixture S was poured into the container P. A neodymium magnet was used as the permanent magnet 42 and the maximum value of magnetic flux density was about 0.3 T on its surface.

Air bubbles B were generated in the slurry-like mixture S by the air bubble generator 41 to disperse the nonmagnetic material particles and the magnetic material particles in the slurry-like mixture S. Thereafter, the permanent magnet 42 was immersed into the slurry-like mixture S in the container P for 30 seconds while the air bubble B was generated in the slurry-like mixture S. Then the permanent magnet 42 was taken out of the slurry-like mixture S.

Thereafter, the processed slurry-like mixture S was collected, and an amount of iron powder contained therein was measured by a magnetic balance.

Figure 21:
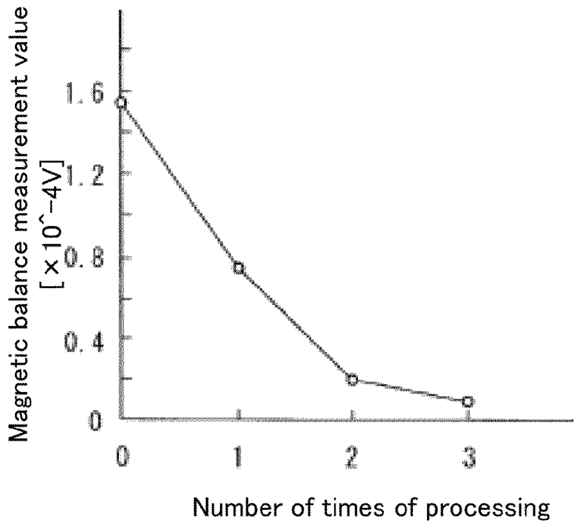
FIG. 21 is a graphic representation of the relation between the number of times of processing and a value measured by the magnetic balance in case that the processing method is applied to a slurry-like mixture.

Further, in this experiment, the step of the separation and removal of the iron powder was repeated three times for the same slurry-like mixture S, and the amount of the iron powder was measured by a magnetic balance every time. FIG. 21 shows the results.

Figure 22:
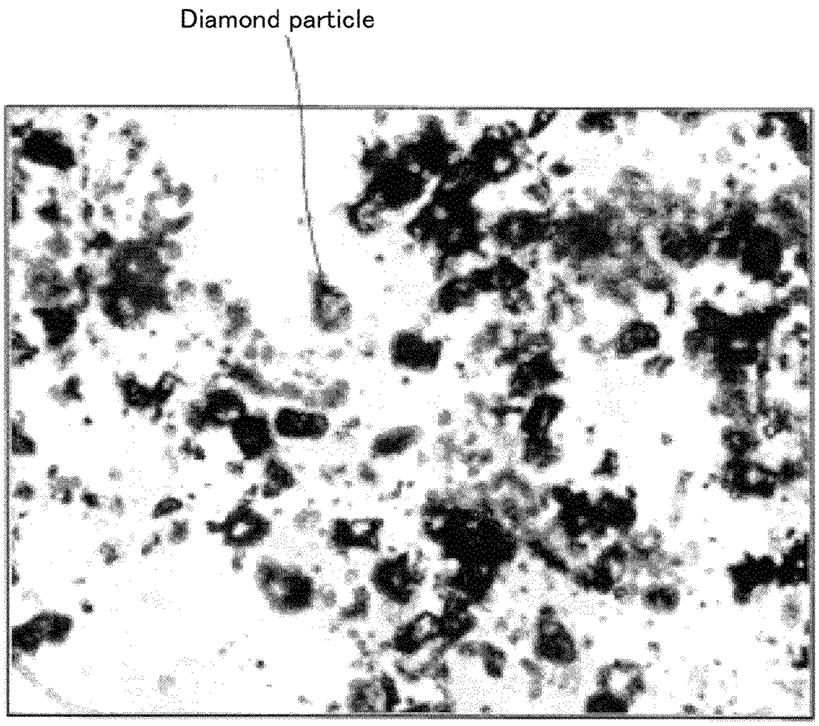
FIG. 22 is a view showing a microscopic observation image of a slurry-like mixture after processing it.

For the processed slurry-like mixture S (after three repetitions of the step of separation and removal of iron powder), centrifugation was conducted at a rotation speed of 1500 rpm for 15 minutes to separate and remove the removed powder of semiconductor from the slurry-like mixture S. Then microscopic observation was conducted for the slurry-like mixture S from which the removed powder of semiconductor had been removed. FIG. 22 shows an observation image obtained by the microscopic observation.

Experimental Result

From the graph shown in FIG. 21, it can be seen that the iron powder decreases from an amount before processing corresponding to about $1.5\times10^{-4}$ V to an amount corresponding to about $0.1\times10^{-4}$ V by conducting the aforementioned process three times. The observation image shown in FIG. 22 reveals that there is little iron powder remaining in the slurry-like mixture S after processing. It is also revealed that plenty of the diamond particles remain in the slurry-like mixture S after processing.

Therefore, it was confirmed that the iron powder can be removed from the slurry-like mixture S while leaving the diamond particles in the slurry-like mixture S by using the processing method according to this embodiment.

3-4. Modified Example

In the processing method, the magnetic field may be applied after stopping the air bubble generator 41 in case that the dispersed state of the nonmagnetic material particles and the magnetic material particles is maintained after stopping generation of the air bubbles B.

Also in the processing method according to the present embodiment, a magnetic field may be applied to the slurry-like mixture S using a superconducting magnet in place of the permanent magnet 42, likewise the processing method described for the modified example 4 of the first embodiment.

Further, as described for the modified example 5 of the first embodiment, the processing method according to the present embodiment can be applied not only to a slurry-like mixture S including nonmagnetic material particles and magnetic material particles which are suspended in a liquid (fluid medium), but also to a mixture including first particles and second particles that are made of either a magnetic material or a nonmagnetic material and suspended in a liquid (fluid medium).

4. Fourth Embodiment

The processing method according to this embodiment is a method of processing a mixture having first particles made of a magnetic material or a nonmagnetic material and second particles made of a magnetic material or a nonmagnetic material wherein the second particles are mixed in a fluid medium containing the first particles. For example, it can be applied to the slurry-like mixture S including magnetic material particles that are mixed into a slurry containing nonmagnetic material particles suspended in a liquid (fluid medium). Here, the magnetic material includes a ferromagnetic material, and the nonmagnetic material includes a paramagnet material and a diamagnetic material.

In the following, an embodiment of processing the slurry-like mixture S will be described.

4-1. Processing Apparatus for Mixture

Figure 23:
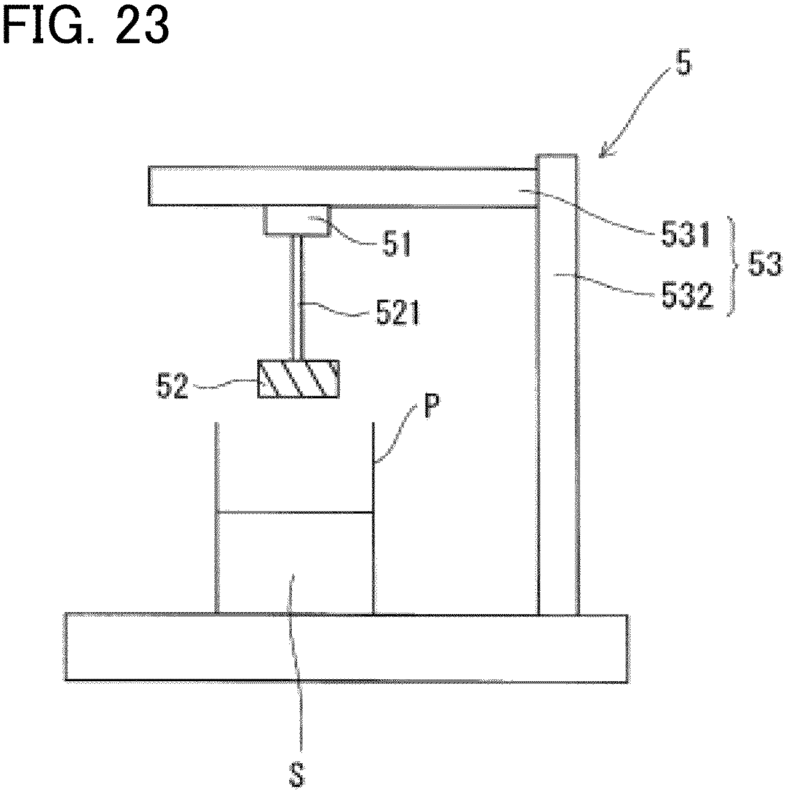
FIG. 23 is a vertical section view showing a processing apparatus used in a method for processing a mixture according to a fourth embodiment of the present invention.

The processing method according to the present embodiment is executed by using a processing apparatus 5 shown in FIG. 23. The processing apparatus 5 includes a motor 51, a permanent magnet 52 and an elevator 53.

The elevator 53 includes a moving part 531 capable of reciprocally moving in a vertical direction, and a support base 532 for supporting the moving part 531, and the motor 51 is installed in the moving part 531. A rotation axis of the motor 51 is connected with a bar-shaped member 521 extending downward, and the permanent magnet 52 is installed at the distal end of the bar-shaped member 521. Therefore, the permanent magnet 52 rotates as the motor 51 rotates. Here, a permanent magnet having a magnetic flux density of various magnitudes can be used as the permanent magnet 52.

Figure 24:
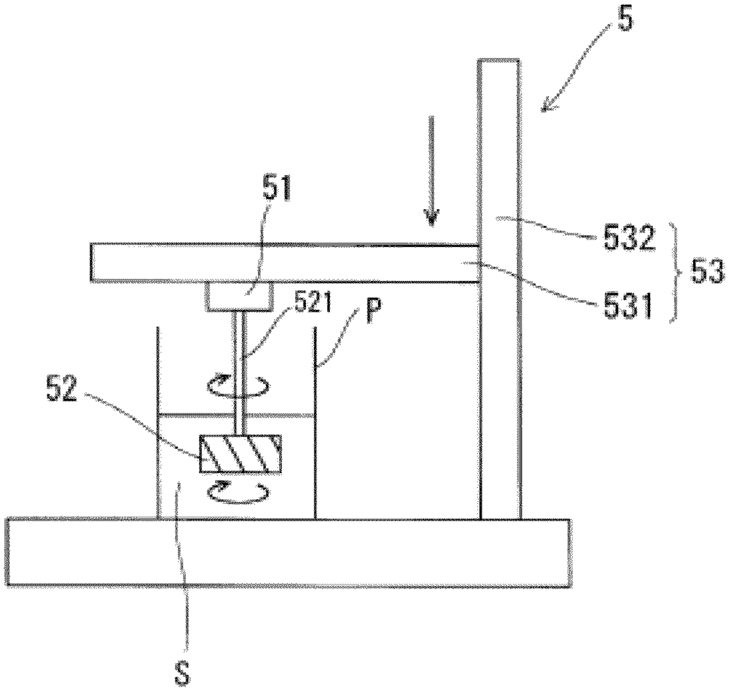
FIG. 24 is a vertical section view for illustrating a method for processing a mixture by the processing apparatus.

In the processing apparatus 5, after placing the container P containing the slurry-like mixture S below the permanent magnet 52, the permanent magnet 52 can be immersed into the slurry-like mixture S in the container P by lowering the moving part 531 of the elevator 53 as shown in FIG. 24.

On the contrary, as shown in FIG. 23, the permanent magnet 52 can be taken out of the slurry-like mixture S in the container P by elevating the moving part 531 of the elevator 53.

4-2. Processing Method for Mixture

A method of processing the slurry-like mixture S using the processing apparatus 5 will be described. First, as shown in FIG. 23, the container P containing the slurry-like mixture S is placed below the permanent magnet 52.

In this phase, the nonmagnetic material particles and the magnetic material particles in the slurry-like mixture S bind each other to form aggregates.

Next, the permanent magnet 52 is rotated by driving the motor 51. Then as shown in FIG. 24, while the permanent magnet 52 is rotated, the moving part 531 of the elevator 53 is lowered to immerse the permanent magnet 52 in the slurry-like mixture S in the container P.

By immersing the permanent magnet 52 into the slurry-like mixture S, the magnetic material particles and the nonmagnetic material particles in the slurry-like mixture S are respectively subjected to a magnetic force Fm of different magnitudes from the permanent magnet 52, and the aggregates are adsorbed to the surface of the permanent magnet 52 by the magnetic force.

Since the permanent magnet 52 rotates, the aggregates adsorbed to the surface of the permanent magnet 52 also rotate, and as a result, a shear force is applied to the aggregates with respect to the liquid (fluid medium). Since the magnetic material particles in the aggregates are subjected to a large magnetic force Fm from the permanent magnet 52, they are easily adsorbed to the permanent magnet 52 and tend to remain on the surface of the permanent magnet against the shear force. On the other hand, since the nonmagnetic material particles in the aggregates are subjected to a very small magnetic force Fm from the permanent magnet 52, they are difficult to be adsorbed to the permanent magnet 73 and are shaken off from the surface of the permanent magnet 52 by the shear force. Therefore, the aggregates in the mixture M are broken down on the surface of the permanent magnet 52, and the magnetic material particles are placed on the surface of the permanent magnet 52 in the slurry-like mixture S.

Thereafter, the rotation of the motor 51 is stopped. Then the moving part 531 of the elevator 53 is elevated, and the permanent magnet 52 is taken out of the slurry-like mixture S in the container P. As a result, the magnetic material particles are removed from the slurry-like mixture S. At this time, most of the nonmagnetic material particles remain in the slurry-like mixture S.

Therefore, due to the aforementioned processing method, the magnetic material particles can be removed from the slurry-like mixture S while leaving most of the nonmagnetic material particles in the slurry-like mixture S.

By conducting the processing method described above once or several times for the slurry-like mixture S, most of the magnetic material particles present in the slurry-like mixture S are separated and removed, resulting that a recyclable slurry is obtained.

Further, by conducting centrifugation on the slurry after processing, it is possible to take out the particles of diamond, silicon carbide or the like, and removed powder caused from a semiconductor or the like separately, so that the recycling of these nonmagnetic material particles is enabled.

4-3. Processing Experiment for Mixture

The inventor of the present application carried out an experiment of separating and removing magnetic material particles using the processing method according to the fourth embodiment, and confirmed that magnetic material particles can be removed from the slurry-like mixture S while leaving nonmagnetic material particles in the slurry-like mixture S.

Experimental Method

A slurry-like mixture S including diamond particles, removed powder of semiconductor and iron powder (magnetic material particles) which are suspended in viscous alcohol was used as a experimental object.

In this experiment, 150 mL of the slurry-like mixture S was poured into the container P. A neodymium magnet was used as the permanent magnet 52 and the maximum value of magnetic flux density was about 0.3 T on its surface.

The permanent magnet 52 was immersed into the slurry-like mixture S in the container P for 30 seconds while the permanent magnet 52 was rotated by the motor 51. Then the permanent magnet 52 was taken out of the slurry-like mixture S.

Figure 25:
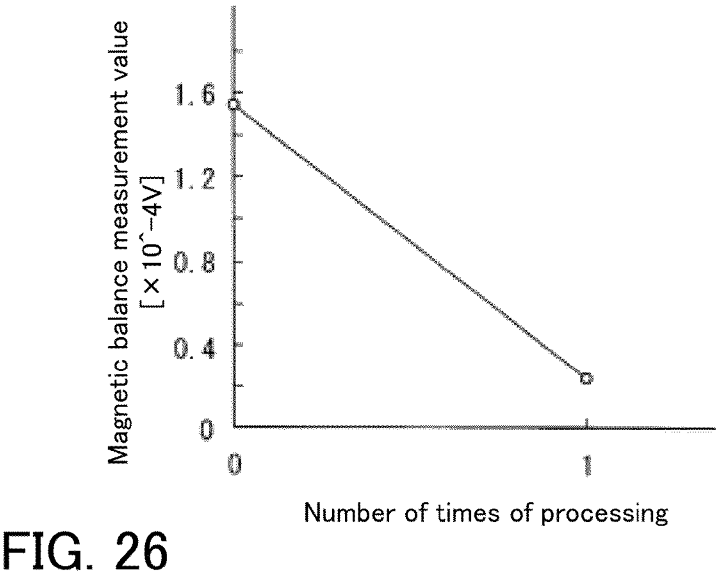
FIG. 25 is a graphic representation of the relation between the number of times of processing and a value measured by the magnetic balance in case that the processing method is applied to a slurry-like mixture.

Thereafter, 5 mL of the processed slurry-like mixture S was collected, and the amount of iron powder contained therein was measured by a magnetic balance. FIG. 25 shows the results.

Figure 26:
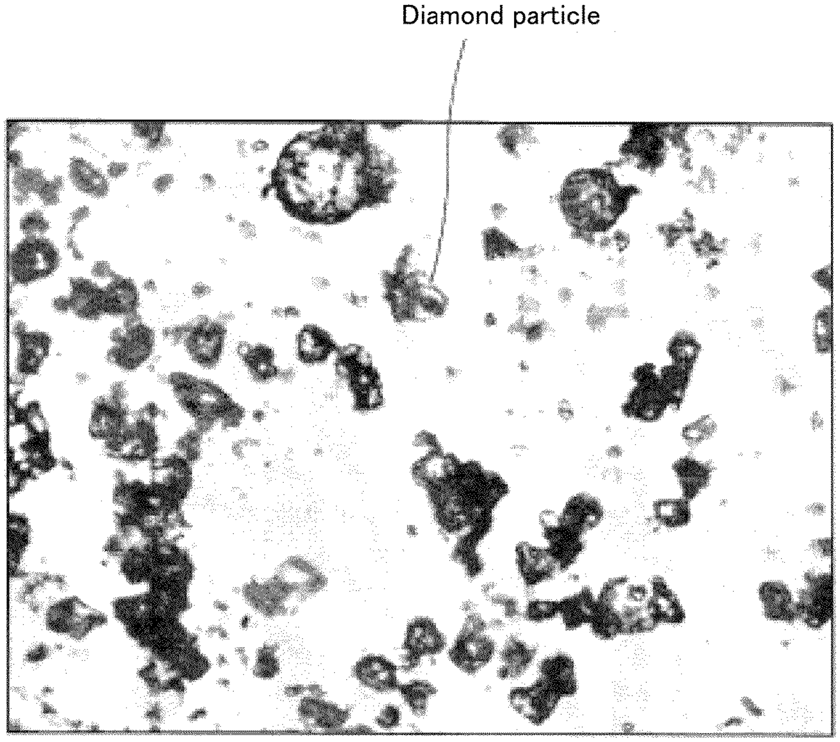
FIG. 26 is a view showing a microscopic observation image of a slurry-like mixture after processing it.

For the processed slurry-like mixture S, centrifugation was conducted at a rotation speed of 1500 rpm for 15 minutes to separate and remove the removed powder of semiconductor from the slurry-like mixture S. Then microscopic observation was conducted for the slurry-like mixture S from which the removed powder of semiconductor was removed. FIG. 26 shows an observation image obtained by the microscopic observation.

Experimental Result

From the graph shown in FIG. 25, it can be seen that the iron powder decreases from an amount corresponding to about $1.5\times10^{-4}$ V before processing to an amount corresponding to about $0.2\times10^{-4}$ V by conducting the aforementioned process just once. The observation image shown in FIG. 26 reveals that there is little iron powder remaining in the slurry-like mixture S after processing. It is also revealed that plenty of the diamond particles remain in the slurry-like mixture S after processing.

Therefore, it was confirmed that by using the processing method according to the present embodiment, the iron powder can be removed from the slurry-like mixture S while leaving the diamond particles in the slurry-like mixture S.

4-9. Modified Example

In the processing method, the magnetic field may be applied to the slurry-like mixture S using a superconducting magnet in place of the permanent magnet 52, likewise the processing method described for the modified example 4 of the first embodiment.

Likewise the processing method described for the modified example 5 of the first embodiment, the processing method according to this embodiment can be applied not only to a slurry-like mixture S including nonmagnetic material particles and magnetic material particles which are suspended in a liquid (fluid medium), but also to a mixture including first particles and second particles that are made of either a magnetic material or a nonmagnetic material and suspended in a liquid (fluid medium).

5. Fifth Embodiment

The processing method according to this embodiment is a method of processing a mixture including first particles made of a magnetic material or a nonmagnetic material and second particles made of a magnetic material or a nonmagnetic material wherein the second particles are mixed in a fluid medium containing the first particles, and is particularly applied to the mixture wherein the fluid medium is a water-based medium. Here, the magnetic material includes a ferromagnetic material, and the nonmagnetic material includes a paramagnet material and a diamagnetic material.

In the following, an embodiment of processing a mixture W including magnetic material particles that are mixed in a water-based medium containing nonmagnetic material particles will be described.

5-1. Processing Apparatus for Mixture

Figure 27:
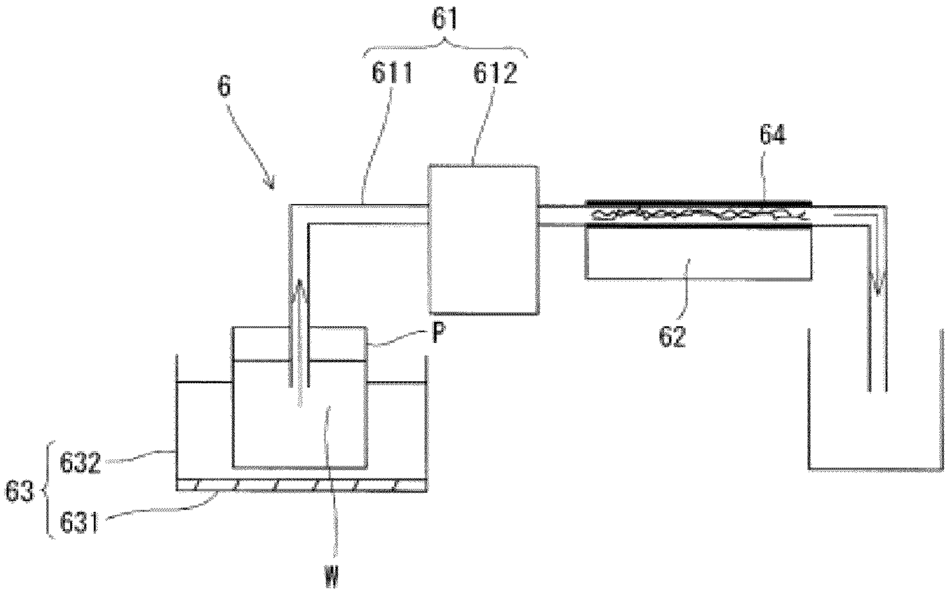
FIG. 27 is a vertical section view showing a processing apparatus used in a method for processing a mixture according to a fifth embodiment of the present invention.

The processing method according to this embodiment is executed by using a processing apparatus 6 shown in FIG. 27. The processing apparatus 6 comprises a liquid transfer unit 61, a permanent magnet 62, an ultrasonic generator 63 and a filament 64 formed of a magnetic material having anti-corrosion characteristics. The liquid transfer unit 61 comprises a liquid flow channel 611 having one end dipped in the mixture W in the container P, and a pump 612 that pumps the mixture W from one end of the liquid flow channel 611 and makes the mixture W flow into the liquid flow channel 611.

The ultrasonic generator 63 comprises a vibrating part 631 for generating an ultrasonic wave, and a water tank 632 provided with the vibrating part 631 on its bottom face. The water tank 632 is filled with water to a predetermined level, and the container P containing the mixture W is immersed into the water in the water tank 632. Thus, the ultrasonic wave vibration occurring in the vibrating part 631 is transmitted to the mixture W in the container P via the water.

The permanent magnet 62 is located over a part of the lateral face of the liquid flow channel 61. In the liquid flow channel 611, the filament 69 is located at the location opposite to the permanent magnet 62. The permanent magnet 62 and the filament 64 form a magnetic filter.

5-2. Processing Method for Mixture

A processing method according to the present embodiment will be described. First, a mixture W including magnetic material particles that are mixed in a water-based medium containing nonmagnetic material particles is prepared. In this phase, the nonmagnetic material particles and the magnetic material particles in the mixture W bind each other to form aggregates.

Next, the zeta potentials on the surfaces of the nonmagnetic material particles and the magnetic material particles in the mixture W are respectively adjusted by adding an acidic or alkaline aqueous solution to the mixture W to adjust the hydrogen ion exponent (pH) in the mixture W.

Concretely, the pH of the mixture W is adjusted so that it is smaller or larger than both the pH value at the isoelectric point of the nonmagnetic material particles p1 and the pH value at the isoelectric point of the magnetic material particles p2. At this time, the pH of the mixture W is also adjusted to such a value so that the particles in the mixture W (magnetic material particles and nonmagnetic material particles) are not dissolved.

When the pH of the mixture W is adjusted to be smaller than both the value p1 and the value p2 by adding an acidic aqueous solution to the mixture W, both the nonmagnetic material particles and the magnetic material particles are positively charged and therefore, a repulsive force occurs between the nonmagnetic material particles and the magnetic material particles.

Alternatively, when the pH of the mixture W is adjusted to be larger than both the value p1 and the value p2 by adding an alkaline aqueous solution to the mixture W, both the nonmagnetic material particles and the magnetic material particles are negatively charged and therefore, a repulsive force occurs between the nonmagnetic material particles and the magnetic material particles.

Therefore, because of the repulsive force occurring between the nonmagnetic material particles and the magnetic material particles, the binding between the nonmagnetic material particles and the magnetic material particles is weakened or cancelled, and as a result, the aggregates are more easily to be broken down.

When a flocculating agent is added to the mixture W, the nonmagnetic material particles and the magnetic material particles flocculate at the pH within a predetermined range (from lower limit value p3 to upper limit value p4). Therefore, when the pH of the mixture W is made smaller than both the values p1 and p2, it is necessary to prevent the nonmagnetic material particles and the magnetic material particles from flocculating by further adjusting the pH of the mixture W to be smaller than the lower limit value p3 of the predetermined range where flocculation occurs.

On the other hand, when the pH of the mixture W is made larger than both the values p1 and p2, it is necessary to prevent the nonmagnetic material particles and the magnetic material particles from flocculating by further adjusting the pH of the mixture W to be larger than the upper limit value p4 of the predetermined range where flocculation occurs.

After adjusting the pH of the mixture W, the mixture W after the pH adjustment is poured into the container P immersed into water in the water tank 632 of the apparatus 6. Then an ultrasonic wave is generated by the ultrasonic generator 63, and ultrasonic wave vibration is applied to the mixture W. As a result of this ultrasonic wave vibration, the aggregates made easier to be broken down by the pH adjustment are broken down, and thus the nonmagnetic material particles and the magnetic material particles are dispersed in the mixture W.

After dispersing the nonmagnetic material particles and the magnetic material particles in the mixture W by the ultrasonic generator 63, the liquid transfer unit 61 is driven to pump up the mixture W in the container P and the mixture W is flown in the liquid flow channel 611.

The mixture W reaches the filament 64 arranged in the liquid flow channel 611. The magnetic material particles and the nonmagnetic material particles in the mixture W are respectively subjected to a magnetic force Fm of different magnitudes from the filament 64. Here, since the magnetic material particles in the mixture W are subjected to a large magnetic force Fm from the filament 64, they are adsorbed to the surface of the filament 64. On the other hand, since the nonmagnetic material particles in the mixture W are subjected to a very small magnetic force Fm from the filament 64, they are difficult to be adsorbed to the surface of the filament 64, and hence pass through the location where the filament 64 is arranged, and are discharged from the other end of the liquid flow channel 611.

Therefore, due to the processing method as described above, the magnetic material particles can be removed from the mixture W while leaving most of the nonmagnetic material particles in the mixture W.

By conducting the aforementioned processing method once or several times, most of the magnetic material particles present in the mixture W are separated and removed, and as a result, the recycling of the nonmagnetic material particles is enabled.

5-3. Processing Experiment for Mixture

The inventor of the present application carried out an experiment for separating and removing magnetic material particles using the processing method according to the fifth embodiment, and confirmed that for two kinds of mixtures, magnetic material particles can be removed from the mixture W while leaving nonmagnetic material particles in the mixture W.

Experiment 1

Experimental Method

A mixture W including ceria particles (nonmagnetic material particles) and maghemite powder (magnetic material particles) which are suspended in a water-based medium was used as an experimental object.

The PH at the isoelectric point of the ceria particles is about 7.2, and the pH at the isoelectric point of the maghemite powder is about 7 to 8. In the present experiment, the pH of the mixture W was adjusted to 3 by adding nitric acid to the mixture W.

The permanent magnet 62 that was used had a magnetic flux density of about 0.5 T on its surface. Flow rate of the mixture W flowing in the liquid flow channel 611 was set to 0.15 m/s. The used filament 64 had a line diameter of 0.6 mm.

Figure 28:
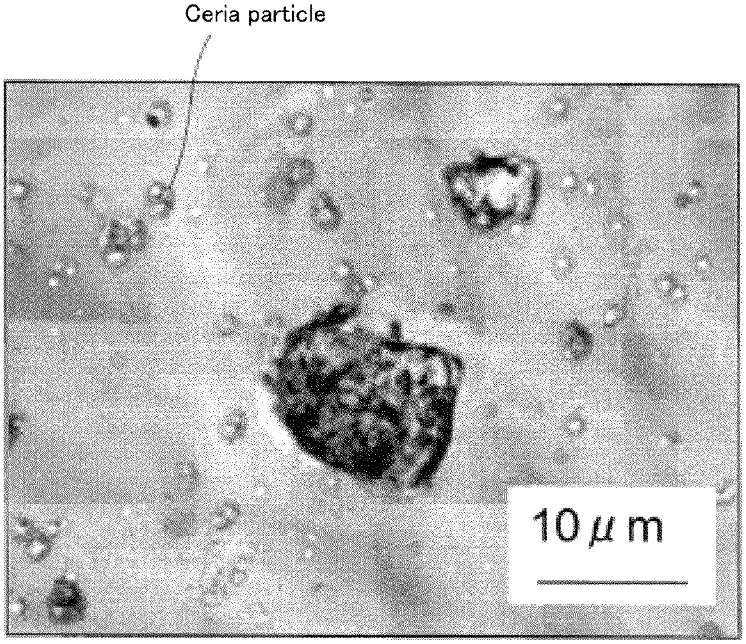
FIG. 28 is a view showing a microscopic observation image of a slurry-like mixture after processing it
Figure 29:
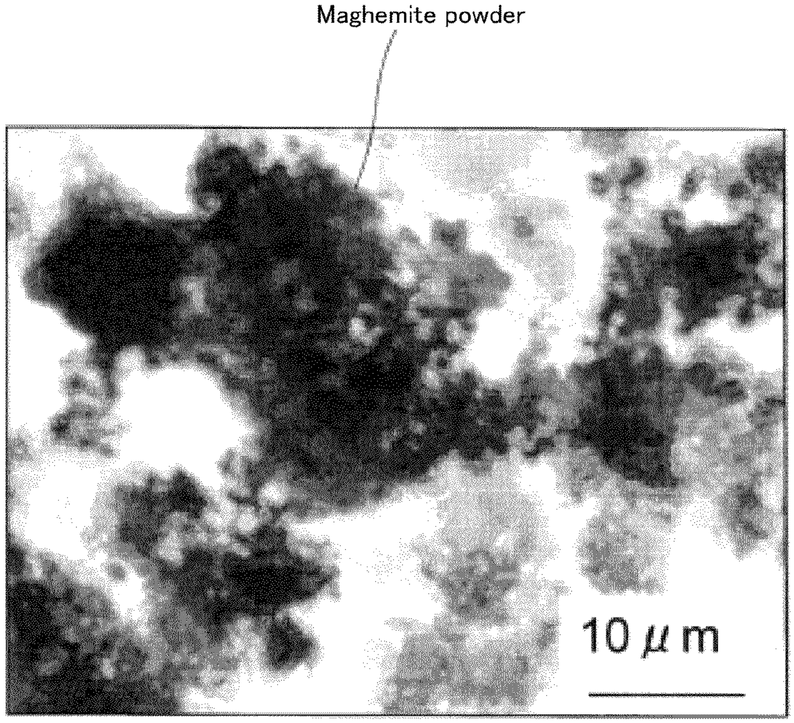
FIG. 29 is a view showing a microscopic observation image of a slurry-like mixture before processing it.
Figure 30:
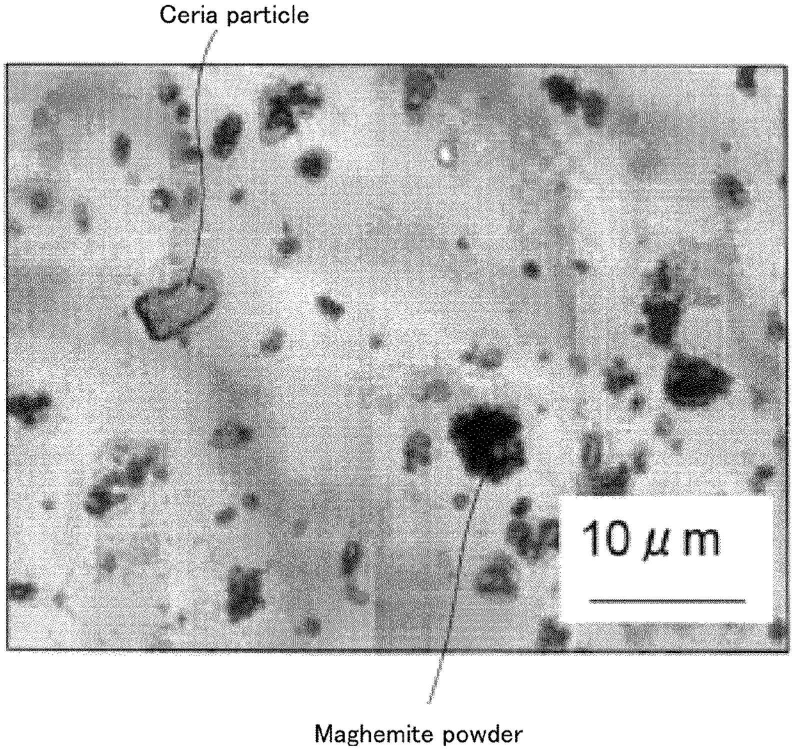
FIG. 30 is a view showing a microscopic observation image of a slurry-like mixture after the dispersion process.

After conducting the process of the mixture W using the processing method according to this embodiment under the above mentioned conditions, the processed mixture W was collected and an amount of maghemite powder contained therein was measured by a magnetic balance. Further, microscopic observation was conducted on the processed mixture W. FIG. 28 shows an observation image obtained by the microscopic observation. For comparing with an observation image of the processed mixture W, the unprocessed mixture W (pH9) and the mixture W (pH3) having been subjected to the pH adjustment and ultrasonic wave vibration were also microscopically observed. FIG. 29 and FIG. 30 show observation images obtained by these microscopic observations.

Experimental Result

The result of the measurements by a magnetic balance revealed that due to the processing method, the maghemite powder contained in the amount corresponding to $-0.098\times10^{-5}$ V before processing decreases to an amount corresponding to $-0.117\times10^{-5}$ V. In this experiment, water is used as a fluid medium. When only water not containing maghemite powder is measured by a magnetic balance, the output voltage of the magnetic balance is about $-0.117\times10^{-5}$ V. This reveals that the amount of maghemite powder is smaller as the output voltage of the magnetic balance is closer to $-0.117\times10^{-5}$ V.

By comparing the observation images shown in FIG. 28 and FIG. 29, it can be seen that most of the maghemite powder present in the mixture W was separated and removed by the process as described above. It can be also seen that plenty of the ceria particles remain in the processed mixture W.

Further, from the observation image shown in FIG. 30, it can be seen that by applying an ultrasonic wave vibration after conducting the pH adjustment, the aggregates in the mixture W are broken down, and the ceria particles and the maghemite powder are dispersed in the mixture W.

Therefore, it was confirmed that by using the processing method according to this embodiment to process the mixture W including ceria particles (nonmagnetic material particles) and maghemite powder (magnetic material particles) which are suspended in a water-based medium, the maghemite powder (magnetic material particles) can be removed from the mixture W while leaving the ceria particles (nonmagnetic material particles) in the mixture W.

Experiment 2

Experimental Method

A mixture W including alumina particles (nonmagnetic material particles) and magnetite powder (magnetic material particles) that are suspended in a water-based medium including aluminum sulfate (flocculating agent) was used as an experimental object.

The PH at the isoelectric point of the alumina particles is about 9, and the pH at the isoelectric point of the magnetite powder is about 5 to 6.5. Further, the pH range in which flocculation occurs by aluminum sulfate is about 5 to 8. Therefore, in the present experiment, the pH of the mixture W was adjusted to 3 by adding nitric acid to the mixture W.

In the present experiment, the pH adjusted mixture W was put into a vial bottle without using the processing apparatus 5. After stirring the mixture W in the vial bottle, the magnetic material particles in the mixture W were allowed to settle in the vial bottle with a superconducting magnet.

Figure 31:
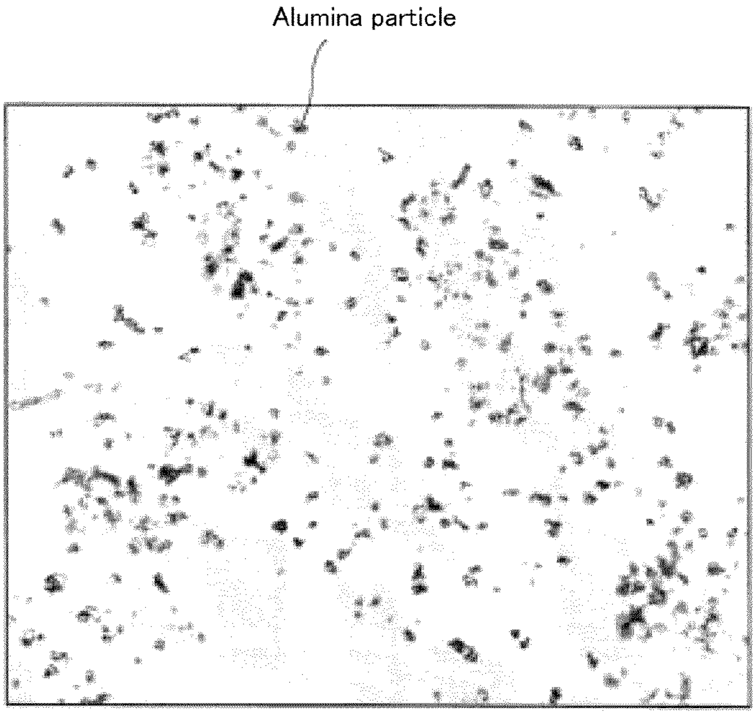
FIG. 31 is a view showing a microscopic observation image of a slurry-like mixture after processing it.
Figure 32:
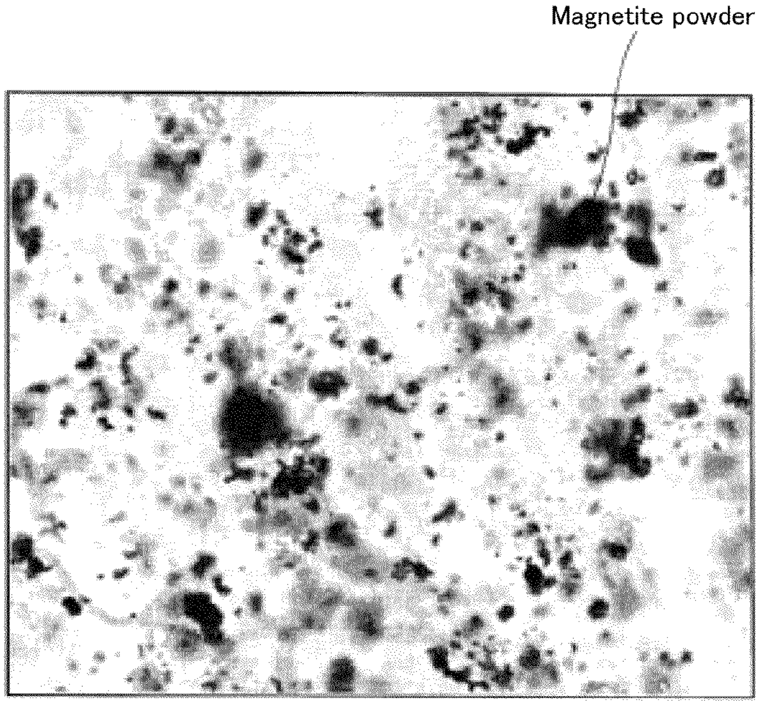
FIG. 32 is a view showing a microscopic observation image of a slurry-like mixture before processing it.
Figure 33:
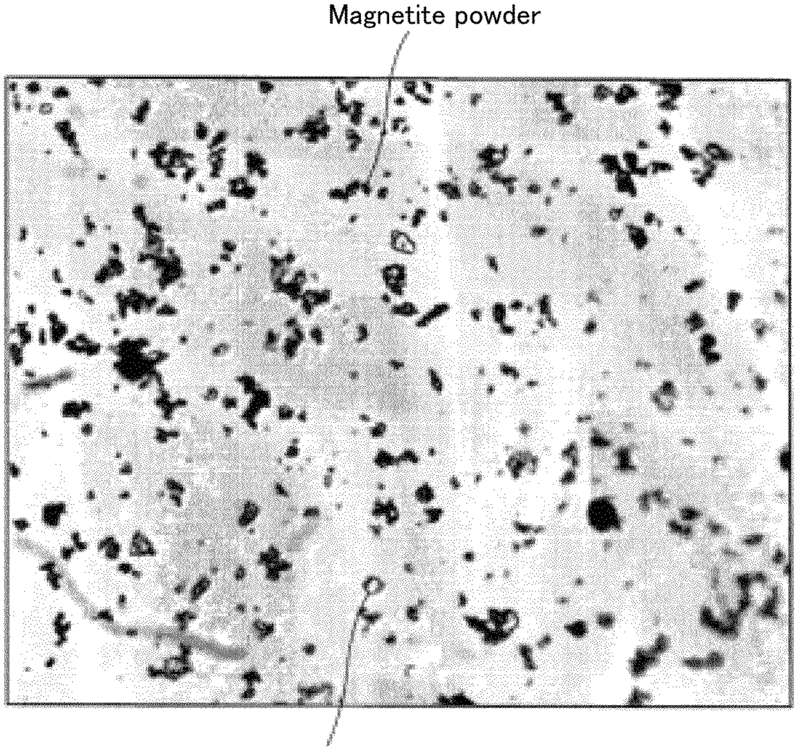
FIG. 33 is a view showing a microscopic observation image of a slurry-like mixture after the dispersion process.

Then a supernatant of the processed mixture W was collected, and an amount of magnetite powder contained therein was measured by a magnetic balance. Further, microscopic observation was conducted for the processed mixture W. FIG. 31 shows an observation image obtained by the microscopic observation. For comparison with an observation image of the processed mixture W, the unprocessed mixture W (pH7), and the pH adjusted mixture W (pH3) before the separation and removal of the magnetite powder were microscopically observed. FIG. 32 and FIG. 33 show observation images obtained by these microscopic observations.

Experimental Result

The result of the measurements by a magnetic balance revealed that due to the processing method, the magnetite powder contained decrease from an amount corresponding to $0.331\times10^{-5}$ V before processing to an amount corresponding to $-0.112\times10^{-5}$ V. In this experiment, water is used as a fluid medium. When only water not containing magnetite powder is measured by a magnetic balance, the output voltage of the magnetic balance is about $-0.117\times10^{-5}$ V. This reveals that the amount of magnetite powder is smaller as the output voltage of the magnetic balance is closer to $-0.117\times10^{-5}$ V.

By comparing the observation images shown in FIG. 31 and FIG. 32, it can be seen that most of the magnetite powder present in the mixture W are separated and removed by the process as described above. It can be also seen that plenty of alumina particles remain in the processed mixture W.

Further, from the observation image shown in FIG. 33, it can be seen that by adjusting the pH, flocculation of alumina particles and magnetite powder is prevented, the aggregates in the mixture W are broken down, and the alumina particles and the magnetite powder are dispersed in the mixture W.

Therefore, it was confirmed that also for the mixture W used in the present experiment, by using the processing method according to the present embodiment, it is possible to remove the magnetite powder (magnetic material particles) from the mixture W while leaving the alumina particles (nonmagnetic material particles) in the mixture W.

5-4. Modified Example

In the processing method, a superconducting magnet may be used in place of the permanent magnet 62. Further in the processing method, there is sometimes the case that particles in the mixture W can be dispersed by pH adjustment without using the ultrasonic generator 63.

In the processing method, both the nonmagnetic material particles and the magnetic material particles are charged positively or negatively by adjusting the pH to disperse the nonmagnetic material particles and the magnetic material particles, however, one of the nonmagnetic material particles and the magnetic material particles may be positively charged and the other may be charged negatively by adjusting the pH. As a result, an attraction force arises between the nonmagnetic material particles and the magnetic material particles, so that they can be aggregated.

Using this principle, for example, when three or more kinds of particles are mixed in the mixture W, only several kinds of particles, that are intended to be removed may be aggregated and removed by adjusting the pH of the mixture W.

Further, as described for the modified example 5 of the first embodiment, the processing method according to the present embodiment may be applied not only to the mixture W having nonmagnetic material particles and magnetic material particles that are mixed in a water-based medium, but also to a mixture having first particles and second particles that are made of either a magnetic material or a nonmagnetic material and mixed in a water-based medium.

6. Sixth Embodiment

The processing method according to this embodiment is a method of processing a mixture having first particles made of a magnetic material or a nonmagnetic material and second particles made of a magnetic material or a nonmagnetic material. The method can be applied, for example, to a mixture in the form of powder. Here, the magnetic material includes a ferromagnetic material, and the nonmagnetic material includes a paramagnet material and a diamagnetic material.

In the following, an embodiment of processing the mixed powder M composed of nonmagnetic material particles and magnetic material particles will be described.

6-1. Processing Apparatus and Processing Method for Mixture

Figure 34:
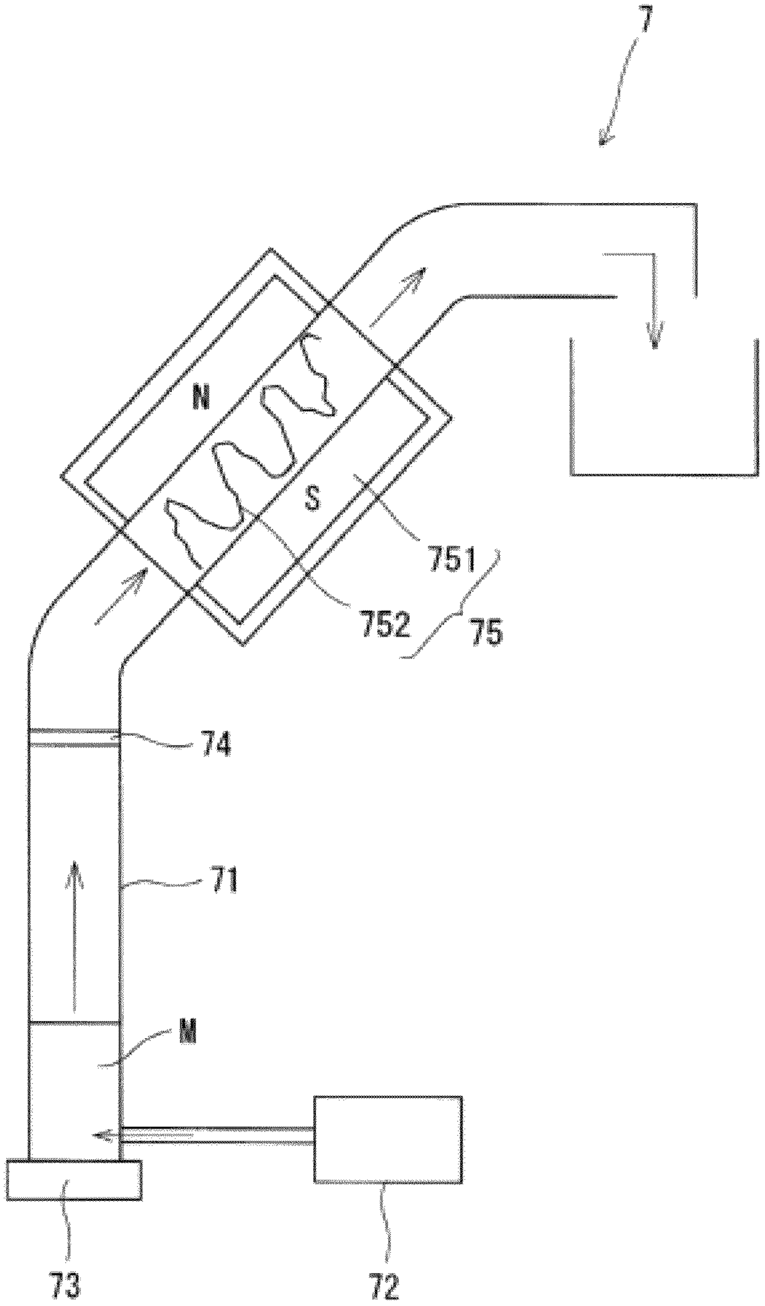
FIG. 34 is a vertical section view showing a processing apparatus used in a method for processing a mixture according to a sixth embodiment of the present invention.

The processing method according to this embodiment is executed using a processing apparatus 7 shown in FIG. 34. The processing apparatus 7 comprises a flow channel 71 in which the mixed powder M flows, an air compressor 72, a permanent magnet 73, a stainless steel mesh 74, and a magnetic filter 75.

The air compressor 72 is connected to one end part of the flow channel 71, and is able to make air flow into the flow channel 71 from the one end by driving the air compressor 72. Therefore, in the flow channel 71, air flow occurs from the one end to the other end. When there is the mixed powder M in the flow channel 71, a driving force is applied to the mixed powder M and a flow of the mixed powder occurs. That is, the air compressor 72 makes the air flow in the flow channel 71 to operate as a driving force applying part that gives a driving force to the mixed powder M using the air flow.

The permanent magnet 73 is located on the outer circumferential face of one end of the flow channel 71. A permanent magnet having a magnetic flux density of various magnitudes can be used as the permanent magnet 73.

The magnetic filter 75 is arranged in one part of the flow channel 71 and comprises an opposed type permanent magnet 751 and an iron mesh 752. The flow channel 71 is partially inserted between the poles of the opposed type permanent magnet 751 and the iron mesh 752 is arranged in the flow channel 71 at a location between the poles of the opposed type permanent magnet 751. A permanent magnet having a magnetic flux density of various magnitudes can be used as the opposed type permanent magnet 751.

The stainless steel mesh 74 is arranged in the flow channel 71 at a location between one end of the flow channel 71 and the magnetic filter 75.

In the case where the mixed powder M is processed using the processing apparatus 7, first, the mixed powder M to be processed is charged in one end part of the flow channel 71.

In this phase, the nonmagnetic material particles and the magnetic material particles in the mixed powder M bind each other by interaction between these particles or moisture in gas to form aggregates.

Then, the air is flown into the flow channel 71 from one end part by driving the air compressor 72. As a result, a driving force is applied to the mixed powder M, and the mixed powder M rolls and flows from the one end part toward the other end part with rolling up.

Since the permanent magnet 73 is located at the outer circumferential face of the one end part of the flow channel 71, the magnetic material particles and the nonmagnetic material particles in the mixed powder M are respectively subjected to a magnetic force Fm of different magnitudes from the permanent magnet 73. The aggregates are adsorbed to the permanent magnet 73 by the magnetic force Fm.

A driving force is applied to the mixed powder M by the air flow (wind pressure) occurring in the flow channel 71. Since the magnetic material particles in the aggregates are subjected to a large magnetic force Fm from the permanent magnet 73, they are easy to be adsorbed to the permanent magnet 73 and hence tend to remain in the one end part of the flow channel 71 against the driving force. On the other hand, since the nonmagnetic material particles in the aggregates are subjected to a very small magnetic force Fm from the permanent magnet 73, they are difficult to be adsorbed to the permanent magnet 73 and hence tend to flow toward the other end part due to the driving force.

Since the air is sprayed on the aggregates adsorbed to the permanent magnet 73, moisture in the aggregates vaporizes.

Therefore, binding between the nonmagnetic material particles and the magnetic material particles is weakened or cancelled, and the aggregates in the mixed powder M are broken down to some extent in an early stage of the processing step. In this phase, some of the magnetic material particles in the mixed powder M are separated from the mixed powder M.

The mixed powder M flowing in the flow channel 71 then passes through the stainless steel mesh 74. As a result, aggregates having a large diameter present in the mixed powder M are captured or pulverized. Accordingly, only the aggregates having a small diameter are contained in the mixed powder M having passed through the stainless steel mesh 74.

Next, the mixed powder M flows into the magnetic filter 75. In the magnetic filter 75, the magnetic material particles in the mixed powder M are subjected to a large magnetic force Fm from the magnetic filter 75, and as a result, the aggregates containing the magnetic material particles are adsorbed to a surface of the iron mesh 752.

The driving force is applied to the mixed powder M by the air flow occurring in the flow channel 71. The magnetic material particles in the aggregates tend to remain on the surface of the iron mesh 752 against the driving force by the applied magnetic force Fm. On the other hand, since the nonmagnetic material particles in the aggregates are subjected to a very small magnetic force Fm from the iron mesh 752, they are difficult to be adsorbed to the surface of the iron mesh 752, and hence tend to flow further toward the other end part of the flow channel 71 from the surface of the iron mesh 752 by the driving force (wind pressure of air). The driving force applied to the mixed powder M is preferably smaller than the magnetic force Fm applied to the magnetic material particles.

Further, since the air is sprayed on the aggregates adsorbed to the surface of the iron mesh 752, the moisture in the aggregates vaporizes.

As a result, the binding between the nonmagnetic material particles and the magnetic material particles is weakened or cancelled, and the aggregates in the mixed powder M are broken down on the surface of the iron mesh 752. The nonmagnetic material particles leave the surface of the iron mesh 752 and flow toward the other end part and the magnetic material particles remain on the surface of the iron mesh 752. Therefore, the magnetic material particles in the mixed powder M are separated from the mixed powder M by the magnetic filter 75 and as a result, the mixed powder M with an increased content percentage of nonmagnetic material particles is discharged from the other end part of the flow channel 71.

Therefore, the magnetic material particles and the nonmagnetic material particles in the mixed powder M are dispersed, and some of the magnetic material particles in the mixed powder M are separated from the mixed powder M.

In the processing apparatus and the processing method described above, it is possible to separate most of the magnetic material particles from the mixed powder M by adjusting the conditions such as a flow rate of the air. In this manner, by separating and removing the magnetic material particles, the recycling of the nonmagnetic material particles and the magnetic material particles is enabled.

Even when magnetic material particles remain in the processed mixed powder M, since the magnetic material particles and the nonmagnetic material particles are dispersed in the mixed powder M, it is possible to separate and remove only the magnetic particles by using other magnetic separating means. Therefore, the recycling of the nonmagnetic material particles and the magnetic material particles is enabled.

6-2. Processing Experiment for Mixture

The inventor of the present application carried out an experiment of separating and removing magnetic material particles using the processing method according to the sixth embodiment, and confirmed that nonmagnetic material particles and magnetic material particles in the mixture M can be separated.

Experimental Method

A mixed powder M including ferrite powder having a mean particle size of 8 μm contained in a rate of 20 wt % in silica particles having a mean particle size of 2 μm was used as an experimental object.

In this experiment, a neodymium magnet was used as the permanent magnet 73 and the maximum value of magnetic flux density was about 0.3 T on its surface. An opposed type neodymium magnet having an internal magnetic flux density of about 0.7 T was used as the opposed type permanent magnet 751. The used stainless steel mesh 74 had a mesh size of #40. A mesh (#5) having a line diameter of 0.6 mm was used as the iron mesh 752. Air was used as the gas flowing in the flow channel 71 and a flow rate of the air was set to 0.3 m/s.

Further, for comparing with the case where the mixed powder M is processed by each of the processing apparatus 7 (Condition 1) including the magnetic filter 75, the stainless steel mesh 74 and the permanent magnet 73, the mixed powder M was processed by the processing apparatus 7 lacking the permanent magnet 73 (Condition 2), the processing apparatus 7 lacking the stainless steel mesh 74 and the permanent magnet 73 (Condition 3), the processing apparatus 7 employing a spiral iron wire having a line diameter of 1.5 mm in place of the iron mesh 752 (Condition 4), the processing apparatus 7 lacking the permanent magnet 73 and the stainless steel mesh 74 and employing a spiral iron wire having a line diameter of 1.5 mm in place of the iron mesh 752 (Condition 5), and the processing apparatus 7 lacking the iron mesh 752, the stainless steel mesh 74 and the permanent magnet 73 (Condition 6).

Figure 35:
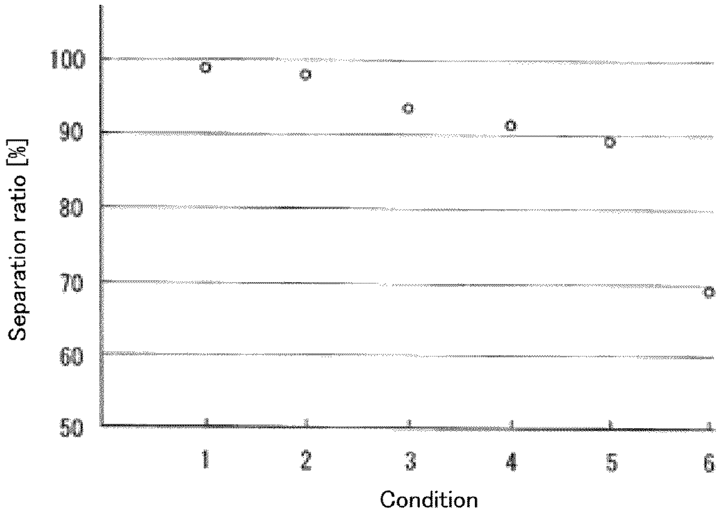
FIG. 35 is a view showing the relation between a process condition and the separation ratio of magnetic material particles.

For each of Conditions 1 to 6, the powder discharged from the other end part of the flow channel 71 was collected, the amount of the ferrite powder contained therein was measured by a magnetic balance, and a percentage of the weight of separated ferrite to the weight of ferrite contained in the mixed powder M before processing (separation percentage) was determined. FIG. 35 shows the results.

Experimental Result

From the results shown in FIG. 35, it can be seen that in case that the mixed powder M is processed by the processing apparatus 7 lacking the iron mesh 752, the stainless steel mesh 74 and the permanent magnet 73, the separation percentage is about 70%, however, in case that the mixed powder M is processed by the processing apparatus 7 including at least the iron mesh 752 or iron wire, a separation percentage of about 90% is obtained.

Therefore, it was confirmed that the silica particles (nonmagnetic material particles) and the ferrite powder (magnetic material particles) in the mixed powder M are separated from each other by providing the flow channel 71 with the magnetic filter 75, and flowing gas in the flow channel, and using the flow of the gas to flow the mixed powder M in the flow channel 71.

The result shown in FIG. 35 reveals that such a high separation percentage exceeding 90% is obtained by providing the processing apparatus 7 with the stainless steel mesh 74 or the permanent magnet 73 besides the magnetic filter 75.

6-3. Modified Example 1

In the processing method, a superconducting magnet may be used in place of the opposed type permanent magnet 751 constituting the magnetic filter 75.

In the processing method, gas other than air or liquid may be used as a medium for applying a driving force to the mixed powder M.

6-4. Modified Example 2

The processing method according to the sixth embodiment as described above can be applied not only to the mixed powder M composed of nonmagnetic material particles and magnetic material particles, but also to a mixture composed of two kinds of nonmagnetic material particles or magnetic material particles, as described in the modified example 5 of the first embodiment. That is, the processing method according to the sixth embodiment can be applied to a mixture composed of first particles and second particles that are made of either a magnetic material or a nonmagnetic material.

First Processing Experiment for Mixture

The inventor of the present application applied the processing method according to the sixth embodiment on the mixed powder M wherein both the first particles and the second particles are magnetic material particles and experimentally confirmed that the first particles and the second particles can be separated by using a difference between the saturated magnetization of the first particles and the saturated magnetization of the second particles, as described in the modified example 5 of the first embodiment.

Experimental Method

A mixed powder M composed of first particles made of magnetite (or ferrite) and second particles made of hematite was used as an experimental object. Both the first particles and the second particles had a particle diameter of about 0.5 μm. The first particles had a saturated magnetization per unit mass of about 80 to 90 $A \cdot m^2/kg$, and the second particles had a saturated magnetization per unit mass of about 1 to 10 $A \cdot m^2/kg$.

In this experiment, a neodymium magnet was used as the permanent magnet 73 and the maximum value of magnetic flux density was about 0.3 T on its surface. An opposed type neodymium magnet having an internal magnetic flux density of about 0.7 T was used as the opposed type permanent magnet 751. The used stainless steel mesh 74 had a mesh size of #40. A mesh (#5) having a line diameter of 0.6 mm was used as the iron mesh 752. Air was used as the gas flowing in the flow channel 71 and the flow rate of the air was set to 0.6 m/s.

The powder discharged from the other end part of the flow channel 71 was collected and amounts of the first particles and the second particles contained therein were measured by a magnetic balance to determine to content percentages of the first particles and the second particles.

Experimental Result

As a result of the experiment, as for the processed mixed powder M, the content percentage of first particles was 0 to 10%, and the content percentage of second particles was 90 to 100%. The significantly small content percentage of first particles is attributable to the fact that when the first particles and the second particles pass in the magnetic field of the permanent magnet 73 and through the magnetic filter 75, a large magnetic force applies to the first particles having a large saturated magnetization, and as a result, the first particles are captured by the permanent magnet 73 or the magnetic filter 75. On the other hand, the significantly large content percentage of the second particles is attributable to the fact that since only a small magnetic force applies to the second particles having a small saturated magnetization, most of the second particles are separated from the first particles by the wind pressure of the air (driving force) (that is, aggregates of the first particles and the second particles are broken down), and as a result, discharged from the other end part of the flow channel 71 after passing through the magnetic field of the permanent magnet 73 and the magnetic filter 75.

As described above, it was confirmed that by applying the processing method according to the sixth embodiment to the case where both the first particles and the second particles are magnetic material particles, the first particles and the second particles can be separated by using the difference between the saturated magnetization of the first particles and the saturated magnetization of the second particles.

Second Processing Experiment for Mixture

For the case where a superconducting magnet is used in place of the opposed type permanent magnet 751 constituting the magnetic filter 75, the inventor of the present application applied the processing method according to the sixth embodiment to the mixed powder M wherein both the first particles and the second particles are magnetic material particles and experimentally confirmed that the first particles and the second particles can be separated through the use of a difference between the saturated magnetization of the first particles and the saturated magnetization of the second particles.

Experimental Method

A mixed powder M composed of first particles made of magnetite (or ferrite) and second particles made of hematite was used as an experimental object. Both the first particles and the second particles had a particle diameter of about 0.5 μm. The first particles had a saturated magnetization per unit mass of about 80 to 90 $A \cdot m^2/kg$, and the second particles had a saturated magnetization per unit mass of about 1 to 10 $A \cdot m^2/kg$.

In the present experiment, a magnetic field of about 2 T was generated in the magnetic filter 75 with the superconducting magnet. A neodymium magnet was used as the permanent magnet 73 and the maximum value of magnetic flux density was about 0.3 T on its surface. The used stainless steel mesh 74 had a mesh size of #40. A plurality of columnar members formed of ferromagnetic stainless steel each having a square cross section (7 mm diagonal line) were used in place of the iron mesh 752. Air was used as the gas flowing in the flow channel 71, and the flow rate of the air was set to 0.6 m/s.

The powder discharged from the other end part of the flow channel 71 was collected, and amounts of the first particles and second particles contained therein were measured by a magnetic balance to determine a percentage of the second particles contained in the processed mixed powder M to the second particles contained in the unprocessed mixed powder M (separation percentage), and a content percentage of second particles for the processed mixed powder M.

Experimental Result

As a result of the experiment, the separation percentage of second particles was 80 to 100%, and the content percentage of second particles was 95 to 100%. When the first particles and second particles pass in the magnetic field of the permanent magnet 73 and in the magnetic filter 75, a large magnetic force is applied to the first particles having a large saturated magnetization, and as a result, the first particles are captured by the permanent magnet 73 and the magnetic filter 75. On the other hand, a small magnetic force is applied to the second particles having a small saturated magnetization, so that most of the second particles are separated from the first particles by the wind pressure of air (driving force) (that is, the aggregates between first particles and second particles are broken down), and as a result, they are discharged from the other end part of the flow channel 71 after passing through the magnetic field of the permanent magnet 73 and the magnetic filter 75. The significantly large separation and content percentages of the second particles are attributable to this fact.

As described above, it was confirmed that by applying the processing method according to the sixth embodiment with a superconducting magnet to the case where both the first particles and the second particles are magnetic material particles, the first particles and the second particles can be separated through the use of a difference between the saturated magnetization of the first particles and the saturated magnetization of the second particles. By this experiment, it was also confirmed that second particles can be collected at a high rate (separation percentage).

6-5. Modified Example 3

Figure 39:
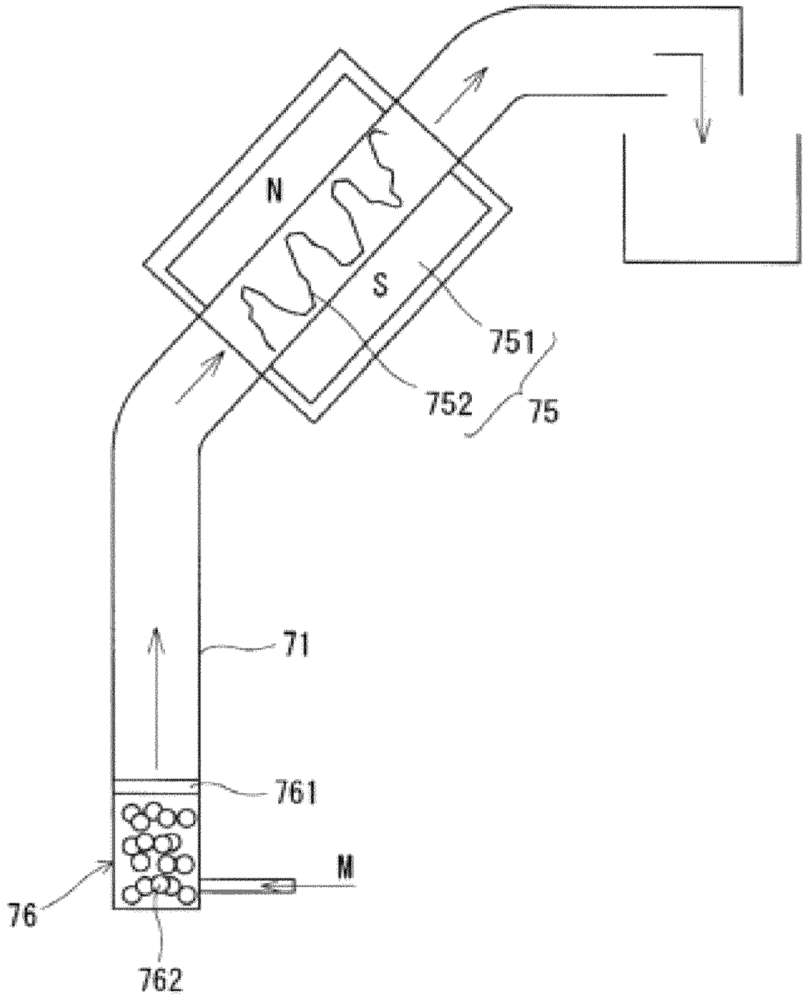
FIG. 39 is vertical section view showing a modified example of a processing apparatus used in a method for processing a mixture according to the sixth embodiment of the present invention.

In the aforementioned processing apparatus 7, a dispersion chamber 76 may be provided in one end section of the flow channel 71 as shown in FIG. 39. The dispersion chamber 76 is formed by placing a filter 761 in the one end section and constructed to hold a plurality of plastic or ceramic spheres 762 in the space upstream of the filter 761. The filter 761 is a filter that prevents the spheres 762 from passing, while allowing passage of the first particles or second particles that are not in an aggregated state, and the ones having a small diameter of the aggregates of first particles and second particles. In addition, in the processing apparatus according to this modified example, the mixed powder M is sucked into the dispersion chamber 76 with an air compressor or the like.

In the processing apparatus of this modified example, as the mixed powder M is sucked into the dispersion chamber 76, the plurality of spheres 762 are stirred in the dispersion chamber 76. Thus, the aggregates in the mixed powder M receive a compressive force, a shear force, an impact force, and a grinding force from the spheres 762 and are broken down to such a size capable of passing through the filter 761.

Therefore, even if aggregates are contained in the mixed powder M having passed through the filter 761, the diameters of the aggregates are small, and hence the mixed powder M is introduced to the magnetic filter 75 with containing no aggregates having a large diameter. Therefore, the mixed powder M is magnetically separated efficiently in the magnetic filter 75.

Processing Experiment for Mixture

The inventor of the present application experimentally confirmed that the nonmagnetic material particles and the magnetic material particles in the mixed powder M can be efficiently separated by using the processing apparatus according to this modified example for the mixed powder M composed of the nonmagnetic material particles and the magnetic material particles.

Experimental Method

A mixed powder M of paramagnetic material, particles and magnetic material particles having a particle size of about 20 to 50 μm was used as an experimental object.

In this experiment, milling balls having a diameter of 250 to 1000 μm (formed of PET or ceramic) were used as the spheres 762. An opposed neodymium magnet having an internal magnetic flux density of about 0.7 T was used as the opposed type permanent magnet 751. A mesh (#5) having a line diameter of 0.6 mm was used as the iron mesh 752. Air was used as the gas flowing in the flow channel 71, and the flow rate of the air was set to 0.3 m/s.

The powder discharged from the other end part of the flow channel 71 was collected, and the amount of the paramagnetic material particles contained therein was measured by a magnetic balance to determine a percentage of the paramagnetic material particles contained in the processed mixed powder M to the paramagnetic material particles contained in the unprocessed mixed powder M (separation percentage), and a content percentage of the paramagnetic material particles for the processed mixed powder M.

Experimental Result

As a result of the experiment, the separation percentage of paramagnetic material particles was 80 to 100%, and the content percentage of paramagnetic material particles was 95 to 100%. This result demonstrates that the paramagnetic material particles and the magnetic material particles are separated, and the paramagnetic material particles can be collected at a high rate (separation percentage).

Also, for the case that the dispersion chamber 76 is not provided in the processing apparatus shown in FIG. 39, the inventor of the present application also confirmed that the separation percentage of paramagnetic material particles is 20 to 50%, and the content percentage of paramagnetic material particles is 70 to 80%. Therefore, this experiment demonstrated that the separation percentage and the content percentage are improved by providing the dispersion chamber 76. When the dispersion chamber 76 is not provided, this causes a problem that since aggregates having a large diameter remain in the mixed powder M, the aggregates cannot reach the magnetic filter 75 or the magnetic filter 75 is clogged by the aggregates even if the aggregates reach the magnetic filter 75. However, when the dispersion chamber 76 is provided, the aggregates are broken down so that the problem is solved. The improvement of separation and content percentages is thought to be due to this fact.

7. Seventh Embodiment

The processing method according to the present embodiment is a method for processing a mixture composed of first particles made of a magnetic or nonmagnetic material and second particles made of a magnetic or nonmagnetic material. Here, the magnetic material includes a ferromagnetic material, and the nonmagnetic material includes a paramagnet material and a diamagnetic material.

In the following, an embodiment of processing the mixed mixture M composed of nonmagnetic material particles and magnetic material particles will be described.

7-1. Processing Apparatus and Processing Method for Mixture

Figure 36:
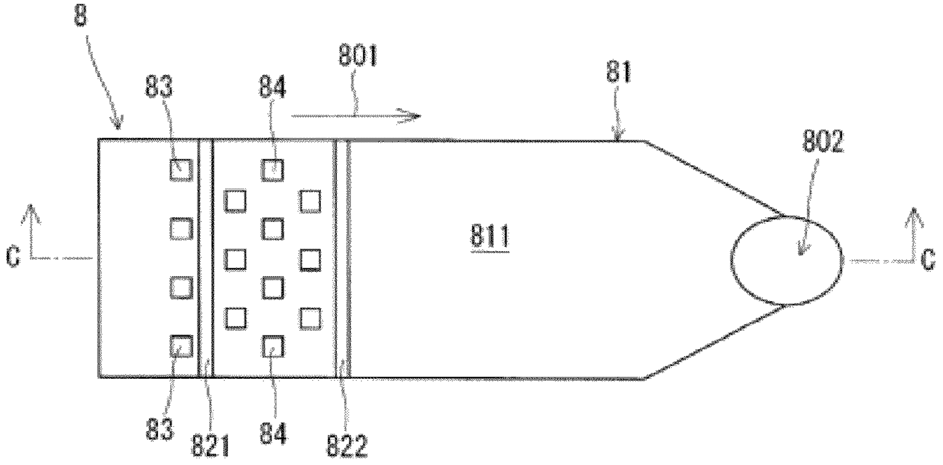
FIG. 36 is a top view showing a processing apparatus used in a method for processing a mixture according to a seventh embodiment of the present invention.
Figure 37:
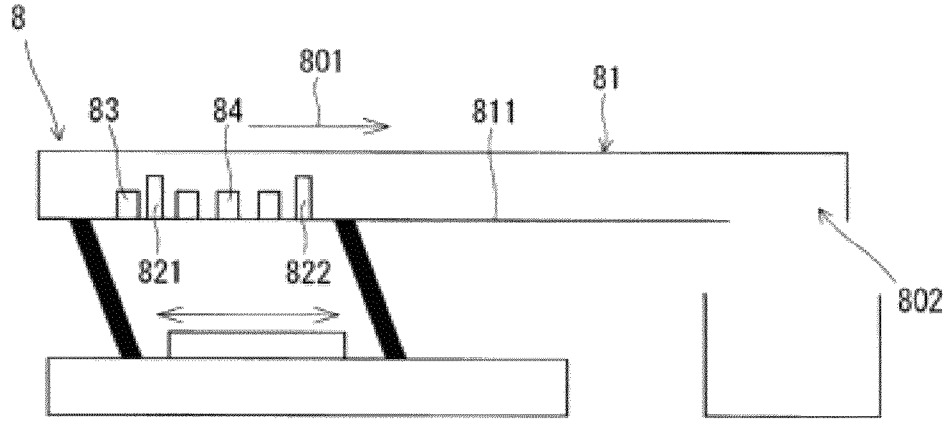
FIG. 37 is a section view along the line C-C shown in FIG. 36.

The processing method according to the present embodiment is executed using the processing apparatus 8 shown in FIG. 36 and FIG. 37. The processing apparatus 8 comprises a vibrating straight advance feeder 81 having a conveying surface 811 on which the mixed powder M is to be conveyed. Vibration by the vibrating straight advance feeder causes the formation of a fluid layer of the mixed powder M on the conveying surface 811 and therefore, a driving force is applied to the mixed powder M along the conveying direction 801. That is, by forming the fluid layer of the mixed powder M on the conveying surface 811, the vibrating straight advance feeder functions as a driving force applying part that applies the driving force to the mixed powder M.

A first mesh 821 and a second mesh 822 are arranged on the conveying surface 811 of the vibrating straight advance feeder 81. They lie in series for the conveying direction 801 and the first mesh 821 is located upstream of the second mesh 822.

A plurality of first permanent magnets 83 are further arranged on the conveying surface 811. The first permanent magnets 83 are located upstream of the first mesh 821 and a plurality of second permanent magnets 84 are arranged between the meshes 821 and 822. Then, the plurality of second permanent magnets 84 constitute a magnetic filter.

When the mixed powder M is processed using the processing apparatus 8, first, the mixed powder M to be processed is placed on the conveying surface 811 at a location upstream of the first mesh 821.

In this stage, the nonmagnetic material particles and the magnetic material particles in the mixed powder M bind to each other to form aggregates.

Next, the vibrating straight advance feeder 81 is vibrated to give the mixed powder M a driving force in the conveying direction 801 and the mixed powder M becomes the form of a fluid layer to move in the conveying direction 801 along the conveying surface 811.

Since the plurality of the first permanent magnets 83 are arranged upstream of the first mesh 821, the magnetic material, particles and the nonmagnetic material particles in the mixed powder M are respectively subjected to a magnetic force Fm of different magnitudes from the first permanent magnet 83 before reaching the first mesh 821, and the aggregates are adsorbed to the surface of the first permanent magnet 83 by the magnetic forces Fm.

The driving force in the conveying direction 801 is applied to the mixed powder M by driving the vibrating straight advance feeder 81. Since the magnetic material particles in the aggregates are subjected to a large magnetic force Fm from the first permanent magnet 83, they are easy to be adsorbed to the first permanent magnet 83 and tend to remain on the surface of the first permanent magnet 83 against the driving force. On the other hand, since the nonmagnetic material particles in the aggregates are subjected to a very small magnetic force Fm from the first permanent magnet 83, they are difficult to be adsorbed to the first permanent magnet 83 and tend to move in the conveying direction 801 by the driving force.

Therefore, the binding between the nonmagnetic material particles and the magnetic material particles is weakened or canceled, and the aggregates in the mixed powder M are broken down to some extent on the surface of the first permanent magnet 83. Further, some of the magnetic material particles in the mixed powder M remain being adsorbed to the surface of the first permanent magnet 83, and are separated from the mixed powder M.

The aggregates in the mixed powder M include those that are broken down by interaction (for example, a shear force) with the conveying surface 811.

Next, the mixed powder M passes through the first mesh 821. The aggregates having a large diameter present in the mixed powder M are captured or pulverized. Therefore, the mixed powder M having passed through the first mesh 821 includes only the aggregates that have a small diameter.

The mixed powder M having passed through the first mesh 821 moves toward the second mesh 822. Since the plurality of second permanent magnets 84 are arranged between the meshes 821 and 822, the magnetic material particles in the mixed powder M are subjected to a magnetic force Fm from the second permanent magnet 84 before reaching the second mesh 822. As a result, the aggregates containing the magnetic material particles are adsorbed to the surface of the second permanent magnet 84.

The magnetic material particles in the aggregates tend to remain on the surface of the second permanent magnet 84 against the driving force by receiving the magnetic force Fm from the second permanent magnet 84. On the other hand, the nonmagnetic material particles in the aggregates are subjected to a very small magnetic force Fm from the second permanent magnet 84, so that they are difficult to be adsorbed to the surface of the second permanent magnet 84 and tend to move in the conveying direction 801 by the driving force. As a result, the binding between the nonmagnetic material particles and the magnetic material particles is weakened or cancelled, and therefore, the aggregates in the mixed powder M are broken down on the surface of the second permanent magnet 84.

In this manner, the nonmagnetic material particles leave the surface of the second permanent magnet 84 and move in the conveying direction 801, and hence the magnetic material particles remain on the surface of the second permanent magnet 84. Therefore, the magnetic material particles in the mixed powder M are separated from the mixed powder M by the second permanent magnet 84, and the mixed powder M having an increased content percentage of nonmagnetic material particles passes through the second mesh 22.

The magnetic material particles and the nonmagnetic material particles in the mixed powder M are dispersed, and some of the magnetic material particles in the mixed powder M are separated from the mixed powder M. Then the dispersed mixed powder M is discharged from a discharge port 802 of the vibrating straight advance feeder 81.

In the aforementioned processing apparatus and processing method, by adjusting conditions such as the number of magnets, and the frequency of the vibrating straight advance feeder, it is possible to separate most of the magnetic material particles from the mixed powder M. The recycling of the nonmagnetic material particles and the magnetic material particles is enabled by separating and removing the magnetic material particles in this way.

On the other hand, even when the magnetic material particles remain in the processed mixed powder M, it is possible to separate and remove only the magnetic material particles by using other magnetic separating means because the magnetic material particles and the nonmagnetic material particles are dispersed in the mixed powder M. Therefore, the recycling of the nonmagnetic material particles and the magnetic material particles is enabled.

7-2. Processing Experiment for Mixture

The inventor of the present application carried out an experiment of separating and removing magnetic material particles using the processing method according to the seventh embodiment, and examined whether nonmagnetic material particles and magnetic material particles in the mixed powder M can be separated.

Experimental Method

A mixed powder M including ferrite powder having a mean particle size of 8 μm which is mixed in a rate of 20 wt % and silica particles having a mean particle size of 2 μm was used as an experimental object.

In the present experiment, as the first and second permanent magnets 83 and 84, a cylindrical neodymium magnet having the maximum value of magnetic flux density of about 0.25 T on its surface (diameter 5 mm, height 5 mm) was used, and a total of 14 (fourteen) first and second permanent magnets 83 and 84 were arranged in the positions as shown in FIG. 36. The conveyance speed of the mixed powder M by the vibrating straight advance feeder 81 was set to 0.1 m/s.

Under the above conditions, a processing experiment using a stainless steel mesh (#60) as each of the first and second meshes 821 and 822 and a processing method using a mesh (#80) formed of a magnetic material (SUS43) as each of the first and second meshes 821 and 822 were conducted.

In each experiment, the processed mixed powder M was collected, and the amount of ferrite powder contained therein was measured by a magnetic balance to determine the percentage of the weight of the removed ferrite powder to the weight of the ferrite powder contained in the unprocessed mixed powder M (separation percentage).

Further, the processed mixed powder M was put into a Petri dish, and the outer circumferential bottom face of the Petri dish was rubbed with a rectangular parallelepiped neodymium magnet having the maximum value of magnetic flux density of about 0.4 T on its surface (bottom face size 50 mm×50 mm, height 10 mm). In this manner, the post treatment was conducted on the processed mixed powder M and the magnetic material particles remaining in the mixed powder M were separated and removed.

Then the mixed powder M after the post treatment was collected, and the amount of the ferrite powder contained therein was measured by a magnetic balance to determine the separation percentage of ferrite powder.

Experimental Result

As a result, in both of the processing experiment using the stainless steel mesh (#60), and the processing experiment using the mesh (#80) formed of magnetic material (SUS430), a separation percentage of about 91% was obtained in the processed mixed powder M. A separation percentage of about 97% was obtained for the mixture powder after the post treatment.

Therefore, it was confirmed that silica particles (nonmagnetic material particles) and ferrite powder (magnetic material particles) in a mixed powder M are separated by installing magnets and meshes within the flow channel through which the mixed powder M flows as a fluid layer according to the processing apparatus 8.

7-3. Modified Example 1

The driving force applying part that forms the fluid layer is not limited to the vibrating straight advance feeder 81. For example, the fluid layer may be formed on the conveying surface by using a gas to blow up the mixed powder M placed on the conveying surface.

In the processing method, superconducting magnets may be used in place of the first to third permanent magnets 83, 84 and 85.

Further, as described for the modified example 5 of the first embodiment, the processing method according to the present embodiment can be applied not only to the mixed powder M composed of nonmagnetic material particles and magnetic material particles, but also to the mixed powder composed of first particles and second particles made of either a magnetic material or a nonmagnetic material.

7-4. Modified Example 2

Figure 40:
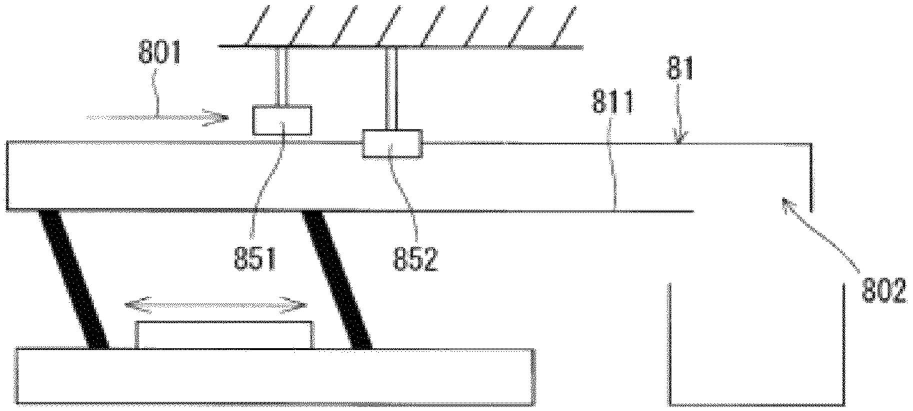
FIG. 40 is a vertical section view showing a modified example of a processing apparatus used in a method for processing a mixture according to the seventh embodiment of the present invention.

In place of the first permanent magnet 83 and the second permanent magnet 84 placed on the conveying surface 811 of the processing apparatus 8, two permanent magnets 851 and 852 having approximately the same surface magnetic flux density may be sequentially arranged from the upstream side to the downstream side at different heights from the conveying surface 811, as shown in FIG. 40. In the processing apparatus shown in FIG. 40, the location of the downstream permanent magnet 852 on the side is lower than that of the upstream permanent magnet 851.

By arranging the two permanent magnets 851 and 852 at the positions of different heights as is the case of the processing apparatus according to this modified example, the magnitude of the magnetic field on the conveying surface 811 varies depending on the position on the conveying surface 811. In the processing apparatus shown in FIG. 40, the magnitude of the magnetic field on the conveying surface 811 is small at the position below or near the permanent magnet 851 arranged at the higher location. The magnitude of the magnetic field on the conveying surface 811 is large at the position below or near the permanent magnet 852 arranged at the lower location.

In the processing apparatus, the magnitude of the magnetic field on the conveying surface 811 can be adjusted by adjusting the heights of the locations of the permanent magnets 851 and 852. Further, two permanent magnets having different surface magnetic flux densities may be used as the two permanent magnets 851 and 852. In this case, even when the two permanent magnets 851 are 852 are arranged at locations of the same height, the magnitude of the magnetic field on the conveying surface 811 varies depending on the position on the conveying surface 811. Further, superconducting magnets may be used in place of the permanent magnets 851 and 852.

The processing apparatus according to this modified example is particularly suited for processing the mixed powder M wherein both the first particles and the second particles are magnetic material particles and the saturated magnetization of the first particles and the saturated magnetization of the second particles are different from each other. This is because the first particles and the second particles can be separated from each other by utilizing a difference between the saturated magnetization of the first particles and the saturated magnetization of the second particles, as described in the modified example 5 of the first embodiment In the following, a case of using the processing apparatus shown in FIG. 40 to process the mixed powder M wherein the saturated magnetization of the first particles is larger than the saturated magnetization of the second particles will be concretely described.

First, the mixed powder M to be processed is placed on the conveying surface 811 at a position upstream of the region of the conveying surface 811 that opposes to the first permanent magnet 851. Here, it is assumed that the first particles and the second particles in the mixed powder M are already in a dispersed state in this phase.

Next, by vibrating the vibrating straight advance feeder 81, a driving force in the conveying direction 801 is applied to the mixed powder M, and the mixed powder M moves as a fluid layer in the conveying direction 801 along the conveying surface 811. Then the mixed powder M reaches a position below or near the first permanent magnet 851.

A small magnetic field from the first permanent magnet 851 applies to the mixed powder M having reached the position below or near the first permanent magnet 851. Therefore, at this position, the first particles having a larger saturated magnetization are subjected to a large magnetic force from the first permanent magnet 851 while the second particles having a smaller saturated magnetization are subjected to a small magnetic force from the first permanent magnet 851. Therefore, most of the first particles are adsorbed to the first permanent magnet 851 while the second particles pass through a position below or near the first permanent magnet 851 without being adsorbed to the first permanent magnet 851.

Thereafter, the mixed powder M having passed through a position below or near the first permanent magnet 851 reaches a position below or near the second permanent magnet 852. A large magnetic field from the second permanent magnet 852 is applied to the mixed powder M having reached a position below or near the second permanent magnet 852. Therefore, in this position, if there are some first particles remaining in the mixed powder M, these first particles will be subjected to a large magnetic force from the second permanent magnet 852. The second particles having the small saturated magnetization are subjected to a large magnetic force from the second permanent magnet 852. Therefore, most of the second particles are adsorbed to the second permanent magnet 852.

As a result, the first particles and the second particles in the mixed powder M are separated by the first permanent magnet 851 and the second permanent magnet 852. When third particles (nonmagnetic material particles, or magnetic material particles having a smaller saturated magnetization than the first particles and the second particles) other than the first particles and the second particles are mixed in the mixed powder M, the mixed powder M having an increased content percentage of third particles as a result of the separation of the first particles and the second particles will pass through a position below the second permanent magnet 852 and be discharged from the discharge port 802 of the vibrating straight advance feeder 81.

Figure 41:
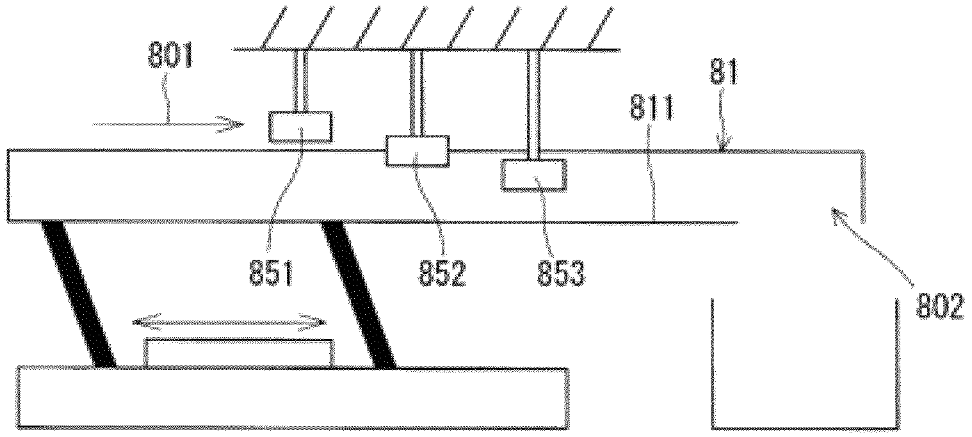
FIG. 41 is a vertical section view showing another modified example of the processing apparatus used in the method for processing a mixture according to the seventh embodiment.

In the processing apparatus according to this modified example, as shown in FIG. 41, three permanent magnets 851 to 853 having approximately the same surface magnetic flux density may be sequentially arranged from the upstream side to the downstream side at different heights from the conveying surface 811. In the processing apparatus shown in FIG. 41, the three permanent magnets 851 to 853 are arranged in such a manner that the more downstream, the lower the location of a magnet. This enables the separation of three kinds of magnetic material particles having different saturated magnetizations from a mixture in which these kinds of magnetic material particles are mixed.

Further, in the processing apparatus according to this modified example, four or more permanent magnets may be sequentially arranged from the upstream side to the downstream side at different heights from the conveying surface 811. This enables separating four or more kinds of magnetic material particles from a mixture in which these kinds of magnetic material particles are mixed.

In these processing apparatuses including three or more permanent magnets, it is possible to adjust the magnitude of the magnetic field on the conveying surface 811 by adjusting the heights of the locations of the permanent magnets. Further, permanent magnets having different surface magnetic flux densities may be employed as the plural permanent magnets. In this case, even when the plural permanent magnets are arranged at locations with the same height, the magnitude of the magnetic field on the conveying surface 811 varies depending on the position of the conveying surface 811.

Processing Experiment for Mixture

The inventor of the present application experimentally confirmed that various particles can be separated from mixed powder in which three kinds of magnetic material particles having different saturated magnetizations are mixed, using the processing apparatus shown in FIG. 41.

Experimental Method

A mixed powder composed of first particles made of magnetite (or ferrite), second particles made of maghemite, and third particles made of hematite was used as an experimental object. Here, these particles have a particle size ranging from several tens μm to several mm. The first particles have a saturated magnetization per unit mass of about 80 to 90 $A \cdot m^2/kg$, the second particles have a saturated magnetization per unit mass of about 20 to 30 $A \cdot m^2/kg$, and the third particles have a saturated magnetization per unit mass of about 1 to 10 $A \cdot m^2/kg$.

In the present experiment, a permanent magnet having a magnetic flux density of about 0.5 T on its surface was used as each of the permanent magnets 851 to 853. The first permanent magnet 851 was arranged at a height of 20 mm from the conveying surface 811 so that the magnitude of the magnetic field on the conveying surface 811 was 0.05 T below the first permanent magnet 851. The second permanent magnet 852 was arranged at a height of 10 mm from the conveying surface 811 so that the magnitude of the magnetic field on the conveying surface 811 was 0.1 T below the second permanent magnet 852. The third permanent magnet 853 was arranged at a height of 5 mm from the conveying surface 811 so that the magnitude of the magnetic field on the conveying surface 811 was 0.4 T below the third permanent magnet 853. Further, a conveyance speed of the mixed powder M by the vibrating straight advance feeder 81 was set to 30 mm/s.

The powder adsorbed to each of the first to third permanent magnets 851 to 853 was collected, and the amounts of the first to third particles contained therein were measured by a magnetic balance to determine to content percentages of the first to third particles.

As a result of the experiment, as for the powder adsorbed by the first permanent magnet 851, a content percentage of first particles was 95 to 100%, a content percentage of second particles was 0 to 5%, and a content percentage of third particles was 0%. As for the powder adsorbed by the second permanent magnet 852, a content percentage of first particles was 0%, a content percentage of second particles was 95 to 100%, and a content percentage of third particles was 0%. As for the powder adsorbed to the third permanent magnet 853, a content percentage of first particles was 0%, a content percentage of second particles was 0%, and a content percentage of third particles was 100%.

In this way, it was confirmed that by using the processing apparatus shown in FIG. 41, three kinds of magnetic material particles having different saturated magnetizations can be separated from the mixed powder composed of these kinds of magnetic material particles.

The configuration for each part of the present invention is not limited to the embodiments and can be modified in various ways within the scope of art described in claims. In the processing method, particles (nonmagnetic material particles and magnetic material particles) in a mixture are dispersed by applying a rotary vibration or an ultrasonic wave vibration to the mixture or by stirring the mixture, however, various methods may be applied as a method for dispersing particles without limiting to the above.

Making a mixture flow while suddenly changing its flow direction may be employed in the processing method of the invention. According to this step, since the flow rate of the mixture changes and a shear force is applied to the mixture, and the particles in the mixture (nonmagnetic material particles and magnetic material particles) are dispersed.

The various configurations of the described processing methods can be applied to mixtures in which various magnetic material particles are mixed, such as stainless steel powder that are made into magnetic material particles by martensitic transformation, nickel or cobalt or a complex (alloy) thereof as well as to the iron powder (magnetic material particles). Further, the various configurations of the aforementioned processing methods may be applied to various mixtures having fluidity such as liquid, sol, gas, gas sol, powder and the like.

For example, in the processing of food such as sausage or drinking water, when there is a possibility that contamination by magnetic material particles or nonmagnetic material particles occurs in the manufacturing process, these particles can be removed by applying the processing methods as described above.

Also for a mixture containing aggregates of rare metal and magnetic material particles or nonmagnetic material particles, the rare metal can be separated from the mixture by applying the processing methods as described above.

EXPLANATION OF REFERENCE NUMERAL

1: mixture processing apparatus, 11: ultrasonic generator, 12: permanent magnet, 14: rotary vibration generator, 15: vertical vibration generator, 2: mixture processing apparatus, 21: stirrer, 22: permanent magnet, 3: mixture processing apparatus, 31: ultrasonic generator, 32: superconducting magnet, 33: filament, 4: mixture processing apparatus, 41: air bubble generator, 42: permanent magnet, 5: mixture processing apparatus, 51: motor, 52: permanent magnet, 6: mixture processing apparatus, 61: liquid transfer unit, 62: permanent magnet, 63: ultrasonic generator, 64: filament, 7: mixture processing apparatus, 71: flow channel, 72: air compressor (driving force applying part), 73: permanent magnet, 74: stainless steel mesh, 75: magnetic filter (magnetic field applying part), 8: mixture processing apparatus, 81: vibrating straight advance feeder (driving force applying part), 811: conveying surface, 821: first mesh, 822: second mesh, 83: first permanent magnet (magnetic field applying part), 84: second permanent magnet (magnetic field applying part), P: container, S: slurry-like mixture, B: air bubble, W: mixture, M: mixed Powder.

The invention claimed is:

1. A method for processing a mixture including a water-based fluid medium containing first particles made of one of a magnetic material and a nonmagnetic material in which second particles made of the other of the magnetic material and the nonmagnetic material are mixed, comprising:

an adjustment step of adjusting the hydrogen ion exponent (pH) of the mixture so that both the first particles and the second particles are charged positively or negatively and a repulsing force arises between the first particles and the second particles;

a dispersion step of dispersing aggregates of the first particles and the second particles present in the mixture after the adjustment step; and a magnetic separation step of separating the first particles and the second particles by applying a magnetic field with the mixture in parallel with the dispersion step or after the dispersion step, wherein magnetic forces, which are different in amount between the first particles and the second particles at least due to a difference of magnetization between the first particles and the second particles, are caused by the magnetic field in the magnetic separation step.

2. The processing method for a mixture according to claim 1, wherein in the dispersion step, vibration is applied to the mixture.

3. The processing method for a mixture according to claim 2, wherein the vibration is ultrasonic vibration.

4. The processing method for a mixture according to claim 1, wherein in the dispersion step, the mixture is stirred, or air bubbles are generated in the mixture.

5. The processing method for a mixture according to claim 1, wherein in the adjustment step, the pH of the mixture is adjusted so that the pH is smaller or larger than both the pH value at a first isoelectric point of the first particles and the pH value at a second isoelectric point of the second particles.

6. The processing method for a mixture according to claim 1, wherein the mixture further contains a flocculating agent, the first particles and the second particles flocculate within a predetermined range of pH having an upper limit value and a lower limit value, and the method further comprises a step of making the pH of the mixture larger than the upper limit value of the predetermined range, or the step of making the pH of the mixture smaller than the lower limit value of the predetermined range.

7. The processing method for a mixture according to claim 1, wherein the magnetic separation step includes the step of making the mixture flow into a flow channel in which a magnetic filter is arranged, and capturing magnetic particles in the mixture by the magnetic filter.

8. The processing method for a mixture according to claim 1, wherein the magnetic force applied to the first particles and the second particles in the magnetic separation step has predetermined magnitude relations between a first drag force that the first particles receive from the fluid medium and a second drag force that the second particles receive from the fluid medium.

9. The processing method for a mixture according to claim 8, wherein the magnetic force applied to the first particles in the magnetic separation step is larger than the drag force that the first particles receive from the fluid medium, and the magnetic force applied to the second particles in the magnetic separation step is smaller than the drag force that the second particles receive from the fluid medium.

10. The processing method for a mixture according to claim 1, wherein in the magnetic separation step, a magnetic field is applied to the mixture by using a superconducting magnet.

11. The processing method for a mixture according to claim 1, wherein in the magnetic separation step, a magnetic gradient is generated for a magnetic field in the mixture.

12. The processing method for a mixture according to claim 11, wherein in the magnetic separation step, the magnetic gradient is generated in the magnetic field by providing magnetic gradient generating means in the mixture.

13. The processing method for a mixture according to claim 1, wherein the first particles or the second particles are abrasive or polishing grains.

* * * * *